(12) United States Patent
Sproat

(10) Patent No.: US 7,664,313 B1
(45) Date of Patent: Feb. 16, 2010

(54) TEXT-TO SCENE CONVERSION

(75) Inventor: Richard William Sproat, Berkeley Heights, NJ (US)

(73) Assignee: AT&T Intellectual Property II, L.P., New York, NY (US)

( * ) Notice: Subject to any disclaimer, the term of this patent is extended or adjusted under 35 U.S.C. 154(b) by 812 days.

(21) Appl. No.: 10/132,845

(22) Filed: Apr. 24, 2002

Related U.S. Application Data

(63) Continuation-in-part of application No. 09/703,622, filed on Nov. 2, 2000.

(60) Provisional application No. 60/242,532, filed on Oct. 23, 2000, provisional application No. 60/288,094, filed on May 3, 2001.

(51) Int. Cl.
*G06K 9/00* (2006.01)
*G06F 17/27* (2006.01)

(52) U.S. Cl. .......................... 382/154; 704/9

(58) Field of Classification Search .............. 704/9; 345/473; 382/154
See application file for complete search history.

(56) References Cited

U.S. PATENT DOCUMENTS

| | | | | |
|---|---|---|---|---|
| 5,630,121 A * | 5/1997 | Braden-Harder et al. | .... | 707/102 |
| 5,684,999 A * | 11/1997 | Okamoto | ................ | 704/9 |
| 5,734,923 A * | 3/1998 | Sagawa et al. | ............ | 715/500.1 |
| 6,040,841 A * | 3/2000 | Cohen et al. | ................ | 345/473 |
| 6,181,351 B1 | 1/2001 | Merrill et al. | | |
| 6,466,213 B2 * | 10/2002 | Bickmore et al. | ............ | 345/473 |
| 6,476,830 B1 * | 11/2002 | Farmer et al. | ................ | 715/769 |
| 6,535,215 B1 | 3/2003 | DeWitt et al. | | |
| 6,608,624 B1 * | 8/2003 | Wang | ........................ | 345/473 |
| 6,675,159 B1 * | 1/2004 | Lin et al. | ........................ | 707/3 |
| 6,724,931 B1 * | 4/2004 | Hsu | ............................ | 382/155 |
| 6,748,398 B2 | 6/2004 | Zhang et al. | | |
| 6,785,651 B1 | 8/2004 | Wang | | |
| 2003/0011643 A1 * | 1/2003 | Nishihata | ..................... | 345/810 |

OTHER PUBLICATIONS

Ratnaparkhi, Adwait; Statistical models for unsupervised prepositional phrase attachment, Aug. 1998; Association for Computational Linguistics—vol. 2, Proceedings of the 17th ICL; pp. 1079-1085.*
Aravind K. Joshi and B. Srivivan, "Disambiguation of Super Parts of Speech (or Supertags); Almost Parsing", COLING 94, The 15th International Conference on Computational Linguistics, Aug. 1994, pp. 154-160, Proceedings vol. 1.

(Continued)

*Primary Examiner*—Richemond Dorvil
*Assistant Examiner*—Eric Yen

(57) ABSTRACT

The invention relates to a method of converting a set of words into a three-dimensional scene description, which may then be rendered into three-dimensional images. The invention may generate arbitrary scenes in response to a substantially unlimited range of input words. Scenes may be generated by combining objects, poses, facial expressions, environments, etc., so that they represent the input set of words. Poses may have generic elements so that referenced objects may be replaced by those mentioned in the input set of words. Likewise, a character may be dressed according to its role in the set of words. Various constraints for object positioning may be declared. The environment, including but not limited to place, time of day, and time of year, may be inferred from the input set of words.

20 Claims, 24 Drawing Sheets

OTHER PUBLICATIONS

Rama Bindiganavale et al., "Dynamically Altering Agent Behaviors Using Natural Language Instructions", Proceedings of the International Conference on Autonomous Agents, 2000, Jun. 4, 2000.

Atsushi Yamada, "Studies on Spatial Description Understanding based on Geometric Constraints Satisfaction", Jan. 1993.

Norman Badler et al., "A Parameterized Action Representation for Virtual Human Agents", Workshop on Embodied Conversional Characteristics (WECC) 98, Oct. 1998, pp. 1-7, Publisher: FX Palo Alto Lab, Palo Alto, CA.

Michael Collins, "Head-Driven Statistical Models for Natural Language Parsing", A Dissertation in Computer and Information Science, Presented to the Faculties of the University of Pennsylvania in Partial Fulfillment of the Requirements for the Degree of Doctor of Philosophy 1999.

* cited by examiner

120

126

US 7,664,313 B1

TEXT-TO SCENE CONVERSION

This application is a continuation-in-part of U.S. patent application Ser. No. 09/703,622, filed Nov. 2, 2000, and claims benefit of U.S. Provisional Application Ser. No. 60/242,532 filed Oct. 23, 2000 and Ser. No. 60/288,094 filed May 3, 2001, each of the above applications is incorporated herein by reference in their entireties.

FIELD OF THE INVENTION

The invention relates to the conversion of text into a three dimensional depiction of the text and methods for inferring the environment in a text-to-scene conversion system.

BACKGROUND OF THE INVENTION

At least one Internet service exists where a user can attach his or her text to an image so that the image and text can be e-mailed as an electronic greeting card. The service, provided by BlueMountain.com, relies on a predetermined catalog of images. A user may only add text to the images found in the predetermined catalog. Another system, by Norman Badler at the University of Pennsylvania, uses a text input to drive a closed three-dimensional graphics environment. Badler's system instructs a character to perform certain actions, it will not construct a character or scene based on input text. It is limited to its preexisting environment. Furthermore, known systems cannot infer the environment from a textual input. That is, known systems cannot take text description of a particular action, and then infer information regarding the location of the action or the time of day the action takes place.

SUMMARY OF THE INVENTION

The invention relates to a method of converting text into three-dimensional scene descriptions, which may then be rendered into three-dimensional images. The invention may generate arbitrary scenes in response to a substantially unlimited range of input text. In one embodiment of the invention, text may be entered into a computer. The text may be passed to a part of speech tagger, which tags the text with grammatical parts of speech. The text may then be parsed. The output of the parser may be converted to a dependency structure. The dependency structure may be semantically interpreted and converted into a scene description. The scene description may be interpreted into a three-dimensional scene. The three-dimensional scene may be rendered into an image.

In one embodiment of the invention, the environment within which a scene takes place may be inferred from the text entered into a system utilizing the text-to-scene conversion methodology described herein. In support of the identification of the environment, a method of generating a set of tuple-term pairs from a corpus of text is disclosed. The method includes the compilation of a set of concordance lines for a set of terms in the corpus of text. Verb-argument tuples and their associated terms may be retrieved from the concordance lines, whereupon a numerical quantification of a strength of association between each verb-argument tuple and its associated term may be computed. Those verb-argument tuples and associated terms whose numerical quantification of strength of association is greater than a predetermined threshold may be identified. The identified tuple-term pairs may form a set of tuple-term pairs that represent the most likely actions that can be associated with the set of terms originally selected from the corpus of text.

DETAILED DESCRIPTION OF AN EMBODIMENT OF THE INVENTION

A system to generate arbitrary scenes in response to a substantially unlimited range of words is presented herein. The system converts a set of words into three-dimensional scene descriptions, which may then be rendered into three-dimensional graphical images. The system may also incorporate a method whereby knowledge of the environment of the scene (e.g., location, time of day, season of year) is derived from a corpus of text. As used hereinafter, the word "text" describes a set of words that may instantiate an idea or concept, regardless of the form used to express the words (such as, e.g., speech, printed material, visual display, etc.).

As an example to illustrate possible inputs and outputs of such a system, consider the sentences "John said that the cat was on the table. The animal was next to a bowl of apples." An embodiment of the system might construct a picture of a human with a cartoon speech-bubble coming out of his mouth. The speech-bubble might contain an image of a cat on a table. Furthermore, the cat might be next to a bowl containing more than one apple. In one embodiment, the system may infer that the table, having a bowl of apples on it, was in a kitchen, thus the table, cat, and bowl of apples might be portrayed as being in a kitchen.

In one embodiment, the system may include a set of software programs, mostly written in Common Lisp, but parts of which may be written in C, Java, and Unix shell programs. Other programming languages may be used without departing from the scope of the invention.

Figure 1:
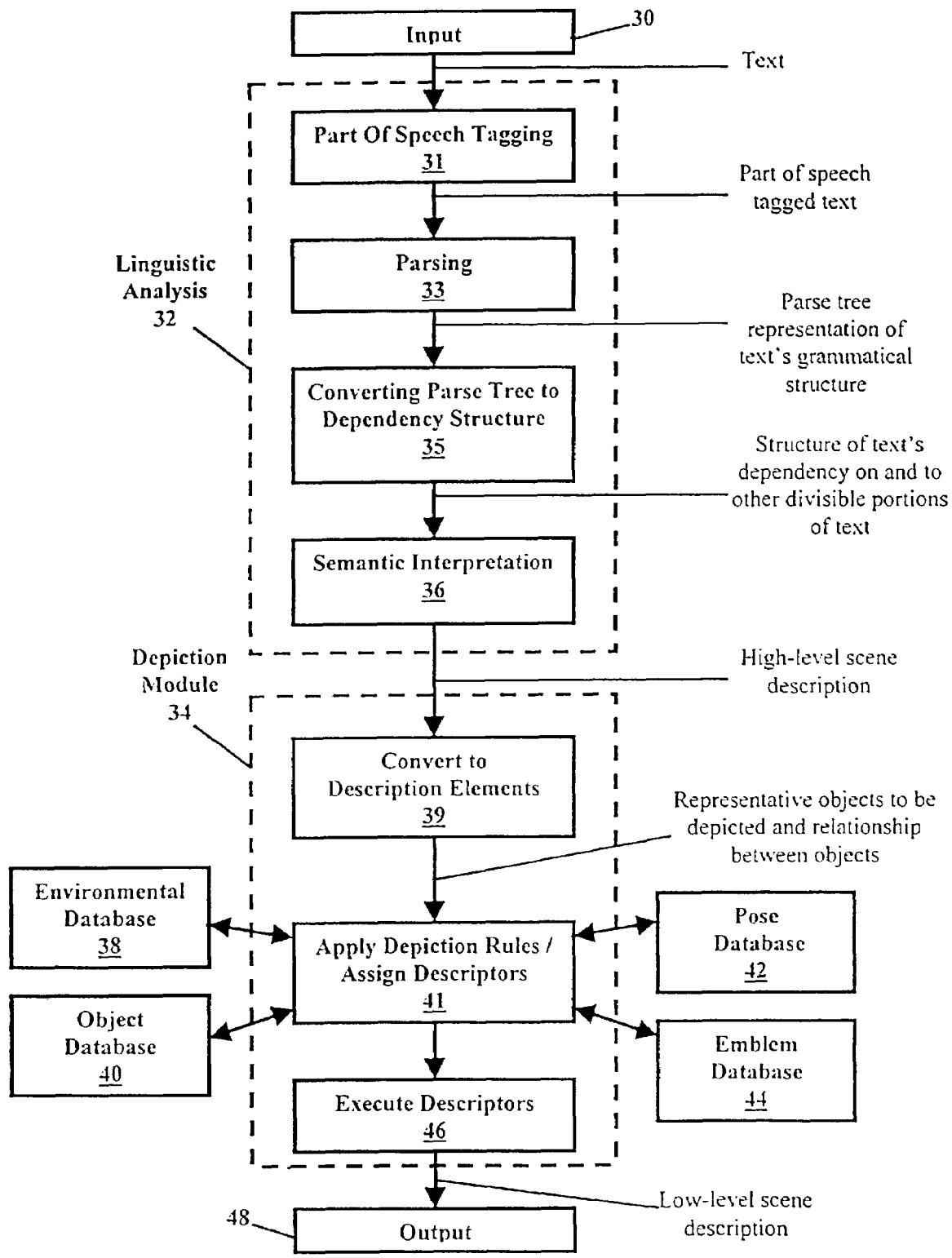
FIG. 1 is a flow diagram indicating the general flow of an embodiment of the invention.

FIG. 1 is a flow diagram indicating the general flow of an embodiment of the invention. Text may be input to the system at block 30. Text may be input by, for example, typing the text into a computer using the computer's keyboard, entering the text via a voice-to-text translation program, entering the text via an optical character recognition system, importing a text file from a memory device, downloading text in any manner to an input port on the system, or entering text in any of the many ways available to those of skill in the art. Text may include one or more words, phrases, or sentences. For ease of illustration, all input text will hereinafter be referred to as "text." At block 32, a linguistic analysis may be performed on the text. Linguistic analysis may include part of speech tagging 31, which tags the text with grammatical parts of speech. Linguistic analysis may also include parsing 33 of the text into a parse tree that represents, for example, the grammatical structure of a sentence. Linguistic analysis may also include converting 35 the parse tree into a dependency structure. A dependency structure typically shows each word in a sentence, and for a given word the dependency structure shows the words that the given word is dependent on and shows the words that depend on the given word. The dependency structure may be semantically interpreted 36 and converted into a high-level scene description.

The high-level scene description may be converted into a low-level scene description in a depiction module 34. The depiction module 34 may convert 39 the high-level scene description to description elements. Description elements may be objects representative of text to be depicted and relationships between those objects. At block 41, depiction rules may be used to assign descriptors to description elements. Several databases may be used to apply depiction rules and assign depictors. Exemplary databases are an environmental database 38, an object database 40, a pose database 42, and an emblem database 44. At block 46, procedures defined by depictors for transforming the objects representative of the text into a low-level scene description may be executed. At block 48 the system provides an output, which may be, for example, a three-dimensional scene description or a three-dimensional rendered image. The output 48 may include the rendering of a three-dimensional image on a computer screen, the generation of a three-dimensional scene description in a computer file such as a VRML file, the printing of a three-dimensional image on hard copy, or any other three-dimensional image format known to persons of skill in the art.

Environmental database 38 may include environment or settings for images. Such an environment or setting might also be considered as a background upon or in which the text may be portrayed. Object database 40 may include a plurality of three-dimensional models for objects to be included in a low-level scene description. In addition to three-dimensional data, an embodiment may associate additional information with each three-dimensional model, such as a function of an object or its size. Pose database 42 may include poses for actions that may be typically associated with scene descriptions, such as jump, give, and carry. Emblem database 44 may include emblems that might be used to label objects to associate the object with any of a plurality of, for example, occupations or uses. Thus, with an appropriate emblem, a human figure might be either a doctor or a gas station attendant, or any occupation associated with an emblem attached to the human figure; a book might be labeled with an emblem resembling a mushroom to illustrate that the book is used for mycology.

Figure 2:
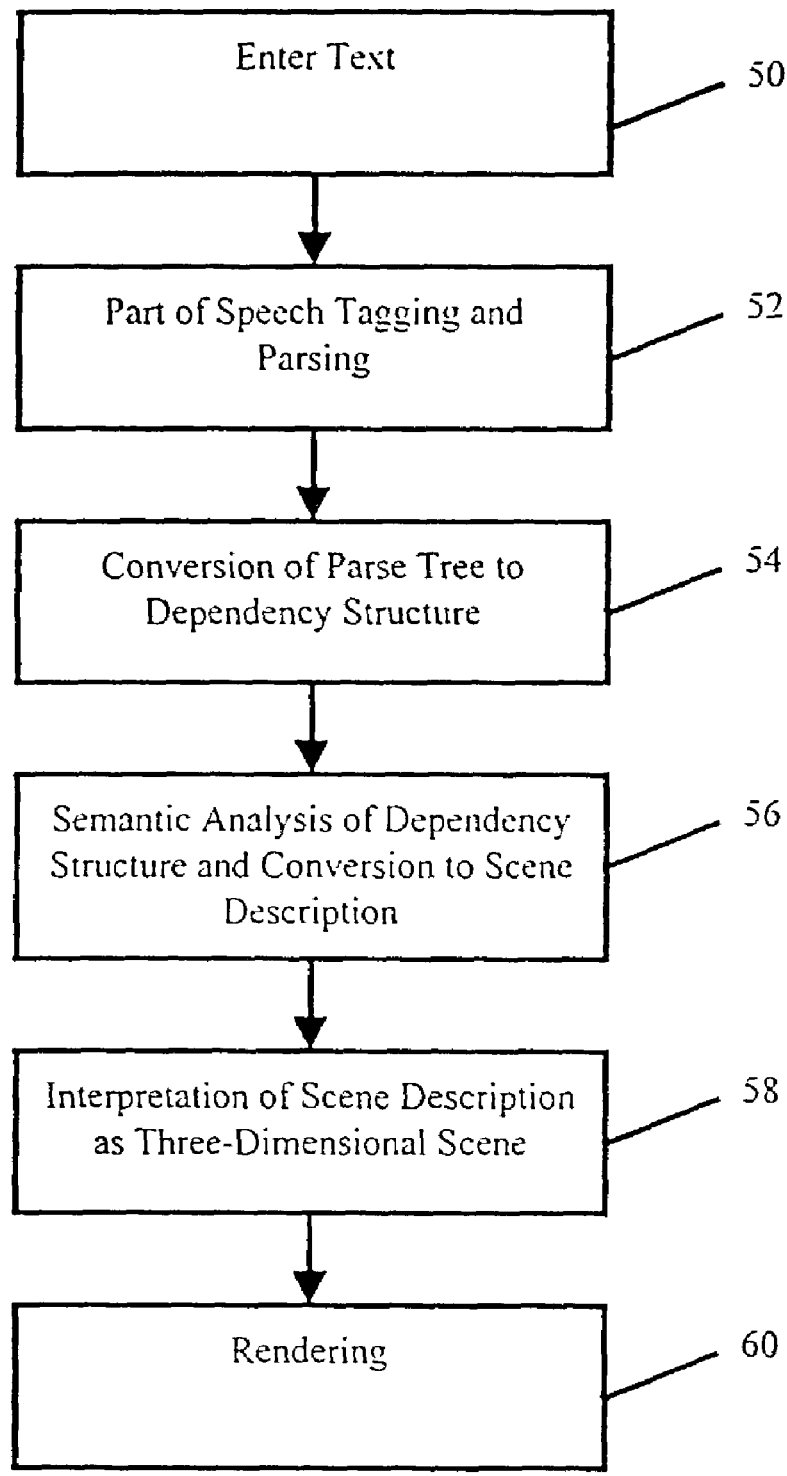
FIG. 2 is a flow diagram indicating the general flow of an embodiment of the invention.

FIG. 2 is a flow diagram indicating the general flow of actions typically embodied by the invention. At step 50, text may be entered into a computer. An example of text that might be entered into the system are the sentences "John said that the cat was on the table. The animal was next to a bowl of apples." These exemplary sentences are not meant to be limiting as to the type of text entered. At step 52 the text may be passed to a part of speech tagger, which tags the text with grammatical parts of speech. The text may then be parsed. At step 54, the output of the parser may be converted to a dependency structure. At step 56 the dependency structure may be semantically interpreted and converted into a scene description. At step 58, the scene description may be interpreted into a three-dimensional scene. At step 60, the three-dimensional scene may be rendered into an image.

In one embodiment, steps 50, 54, 56, 58, and 60 may be implemented in Common Lisp, while steps 58 and 60 may be further implemented on top of, such as, the Mirai® animation system. The embodiment may run on a 450 MHz Pentium® III personal computer under the Windows NT® operating system. A graphics board, such as an Oxygen® VX1 by 3Dlabs® may be used. Step 52 may run on a 194 MHz Silicon Graphics, Inc. model IP25 running the IRIX® 6.5 operating system. Data may be stored locally or remotely. In one embodiment, data may be stored on a Unix® fileserver. Of course, the steps recited above may be implemented using other computer languages/programs without departing from the scope of the invention. Additionally, recitation of computing speeds and types of hardware for computing and storage, as used in the embodiment just disclosed, are not intended as a limitation on the selection of computer hardware or operating systems. Other hardware and operating systems may be used without departing from the scope of the invention.

In another embodiment, the system might be run entirely within the same software system. In yet another embodiment, one might eliminate the tagging and parsing phase in favor of a direct construction of the dependency structure.

Steps 52, 54, 56, 58, and 60 are more fully described below.

Part of Speech Tagging and Parsing

After entry, text may be passed to a part of speech tagger, which tags the text with grammatical parts of speech. In one embodiment, the part of speech tagger used is the MXPOST statistical tagger by Adwait Ratnaparkhi. For the first of the exemplary sentences given above, the result of the part of speech tagging is as given below:

John/NNP said/VBD that/IN the/DT cat/NN was/VBD on/IN the/DT table/NN

This result indicates that John is a proper noun (NNP), said and was are past tense verbs (VBD), the is an article (DT), on is a preposition (IN) (note that in this case that is mistagged as a preposition) and cat and table are nouns (NN). The listing of parts of speech in the above example is illustrative and not meant to be limiting.

The part of speech tagged sentence may be passed to a statistical parser, such as a statistical parser described by Michael Collins, in Head-Driven Statistical Models for Natural Language Parsing (1999) (University of Pennsylvania). The output of a statistical parser is a parse tree that represents the structure of the sentence. The parse tree for the sentence: "John said that the cat was on the table." is represented below:

```
((:HEAD "TOP" "said" 1 1 "node1")
((:HEAD "S" "said" 2 2 "node1")
    ((:HEAD "NP" "John" 1 1 "node2")
        ((:HEAD "NPB" "John" 1 1 "node2") ("John" "NNP")))
    ((:HEAD "VP" "said" 2 1 "node1") ("said" "VBD")
        ((:HEAD "SBAR" "that" 2 1 "node3") ("that" "IN")
            ((:HEAD "S" "was" 2 2 "node4")
                ((:HEAD "NP" "cat" 1 1 "node5")
                    ((:HEAD "NPB" "cat" 2 2 "node5") ("the" "DT") ("cat" "NN")))
                ((:HEAD "VP" "was" 2 1 "node4") ("was" "VBD")
                    ((:HEAD "PP" "on" 2 1 "node6") ("on" "IN")
                    ((:HEAD "NP" "table" 1 1 "node7")
                    ((:HEAD "NPB" "table" 2 2 "node7") ("the" "DT") ("table" "NN")
                    ("." "PUNC.")))))))))))
```

The following identifiers have the following meaning: TOP identifies the top of the tree, S stands for embedded sentence, NP stands for noun phrase, NPB identifies a type of noun phrase, VP stands for verb phrase, SBAR stands for complement sentence, PP stands for prepositional phrase, and PUNC identifies the punctuation mark, in this example the period. This exemplary list is meant to be illustrative and not limiting, the structure of the sentence may be represented in other ways without departing from the scope of the invention.

The above exemplary parse tree represents two kinds of information. First, it represents the constituent structure of the sentence, or in other words which words belong together. For example, it represents that the cat is a noun phrase (NP), on the table is a prepositional phrase (PP), that the cat was on the table is an complement sentence (SBAR), and so forth. Second, it represents the headedness of the sentence, or in other words which words are the heads or "central" words of their constituents. For example, it represents that cat is the head of its noun phrase (NP) (note at parse tree line 8 the result (:HEAD "NP" "cat" 1 1 "node5")). Similarly, it represents that was is the head of the embedded sentence (S) (note at parse tree line 7 the result (:HEAD "S" "was" 2 2 "node4")).

The node numbers listed in the structures are unique identifiers for each node in the parse tree; except that, in the embodiment describer, the node number for a constituent is always the same as the node number of its head. Note, for example, that the verb phrase (VP) "node4" headed by was is the head of the embedded sentence (S) that dominates it, which is also labeled "node4".

Dependency Structure

Figure 3:
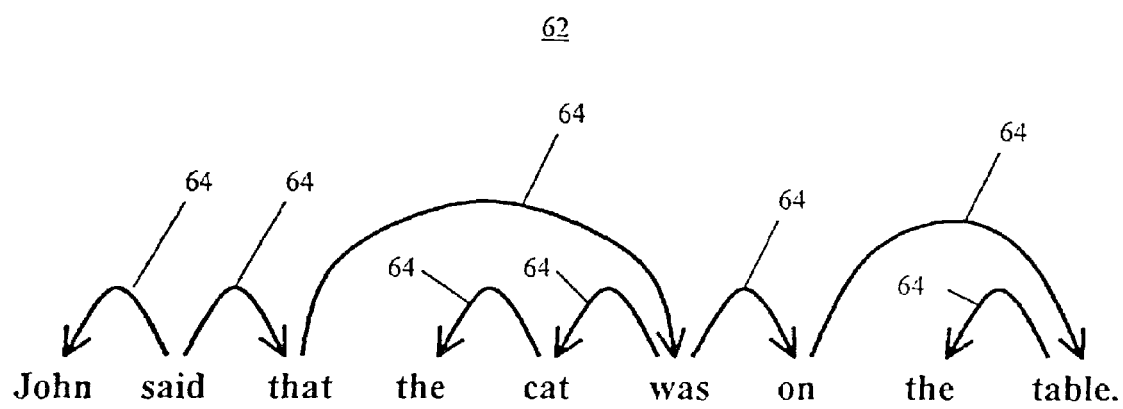
FIG. 3 illustrates a dependency structure.

In FIG. 2, at step 54, the parse tree may be converted into a dependency structure. A dependency structure typically shows each word in a sentence, and for a given word the dependency structure shows the words that the given word is dependent on and shows the words that depend on the given word. For example, in a phrase, all non-head words and heads of all non-head phrases are dependent on the head of that phrase. FIG. 3 illustrates a dependency structure 62 for the sentence: "John said that the cat was on the table." Arrows 64 point from headwords to words that are dependent on the headwords.

A dependency structure is one possible representation of the semantic relations of a sentence. A dependency structure may enable the focusing of attention on certain dependents, while other dependents may be ignored. For example, one might be interested in interpreting all adjectives that depend upon a noun (e.g., the large fat green cat), but ignore the article the. In another embodiment, the semantic relations may be computed directly from the parse trees via a tree-transduction rule.

The dependency structure may be computed from the parse tree as follows: if a constituent Y is the head of a phrase and X is a non-head, then in the dependency structure make head*(Y) the head and head*(X) the dependent. head* is a recursive function, defined as follows, where head(X) returns the head of constituent X:
1. If X is a word then head*(X)=X;
2. otherwise head*(X)=head*(head(X)).

Adjustments to the dependency structure derived via this simple algorithm may be computed at this stage. One adjustment may be to share left-dependents between verbs. This is particularly useful for modal verbs such as may. The dependency structure for John may go would have John as a left-dependent of may, and go as the right-dependent. However, John should also be considered a left-dependent of go, because that noun phrase is the subject of go. This may be accomplished by allowing may to share its left-dependent with the verb that it is the head of, namely go. Note that this process of left-dependent sharing may be lexically driven, meaning that it may be performed for those words that specify, in their lexical representation, that they should share their left-dependents. A lexical representation of may, which specifies the share-Idependents feature, is shown below:

```
(lexical-entry-macro "may"
    :lemmata '("may")
    :parts '(("MD"))
    :operations 'share-Idependents
    :semantics (semantics
        :genus "possibility"
        :funcs '(sem-modal-dependent)))
```

Also shown in this lexical representation is other relevant information such as the part of speech (MD="modal"), the lemmata that may be found for this word, and the semantic frame including information about semantic functions invoked by this lexical entry (see section entitled "Semantic Analysis and the Scene Description").

The same dependent sharing is done by the verb be so that in the example at hand, was shares its left-dependent cat with its right-dependent on, so that the left-dependent of on will now also be cat.

Another adjustment may be to combine certain complex words into single words, for easier subsequent manipulation. An example is the complex verb give up as in John gave the money up. This may be handled in the system by searching the dependency structure for cases where a head word (give) is also the first word in a multi-word lexical entry (give up), and using a greedy algorithm to capture the dependents (up) that match the remainder of that complex entry.

In addition to these structural adjustments, lemma information may be added to the dependency representation: a lemma is the "dictionary" form of the word, without inflectional endings. So the lemma of dog is itself, dog, but the lemma of dogs is dog; the lemma of eats is eat; and the lemma of was is be. This information may be useful because the lexical entries of words may be stored in terms of their lemmata, not in terms of their individual stem forms. In an embodiment of the invention, lemmatization may be accompanied by table lookup: a large list of inflected forms and their associated lemmata may be kept. In another embodiment, one might use a morphological analyzer to compute the lemma of a word. Still other methods of lemmatization are possible without departing from the scope of the invention.

Semantic Analysis and the Scene Description

Returning now to FIG. 2, at step 56, the dependency structure may be converted to a scene description. The scene description may be a description of the objects to be depicted in the scene, and the relationships between the objects.

An example of a scene description for the sentence: "John said that the cat is on the table." is given below:

(("node2"
  (:OBJECT ("mr-happy-group"):LEXICAL-SOURCE "John":SOURCE SELF))
("node1"
  (:ACTION "say":SUBJECT "node2"DIRECT-OBJECT
    ("node3" "node5" "node4" "node7"):TENSE-ASPECT "PAST":SOURCE "VF:SAY-BELIEVE-THAT-S-FRAME"))
("node3" (:STRUCTURAL-NODE "node4":SOURCE COMPLEMENTIZER))
("node5" (:OBJECT ("cat-vp2842"):SOURCE GET-INSTANCES))
("node4"
  (:STATIVE-RELATION "on": FIGURE "node5": GROUND "node7":STRUCTURAL-SOURCE "node6":SOURCE STATIVE-RELATION-PRED))
("node7"
  (:OBJECT
    ("table-vp14364" "nightstand-vp21374" "table-vp4098" "pool_table-vp8359" "table-vp18802" "chinese_furniture_table-vp23846" "desk_childs-vp41795" "desk_w_drawers-vp23679" "card_table_casino-vp42619" "ping_pong_table-vp21198" "roulette_table_casino-vp42624" "counter_kitchen_island-vp16246" "bathroom_vanity-vp15880" "dressing_table-vp6457" "table-vp20056")
    :SOURCE GET-INSTANCES)))

In an embodiment, the scene description may be a list of scene description fragments, each scene description fragment corresponding to a particular node of the dependency structure, and ultimately to the parse tree. Consider "node1", which is the scene description fragment for the ACTION say (note that the designation "node1" corresponds to the node for the structure headed by say in the original parse structure). Node1 is an ACTION, of type "say", whose SUBJECT is "node2", DIRECT-OBJECT of the collection of "node3", "node5", "node4", and "node7", whose TENSE-ASPECT is "PAST", and whose SOURCE is "VF:SAY-BELIEVE-THAT-S-FRAME".

The SUBJECT, "node2", corresponds to the noun phrase John; it is an OBJECT, whose designation is "Mr. Happy Group". The OBJECT "node5" consists of a list comprising a single three-dimensional model. Three-dimensional models may be obtained from, for example, Viewpoint Digital, a 3D digital content provider. In an embodiment, the three dimensional model may be a Viewpoint™ model identified as "cat-vp2842". The designation "vp2842" is a Viewpoint™ catalog number. Similarly, the OBJECT "node7" comprises a list of three-dimensional objects that are consistent with the description table. Finally, "node4" is the STATIVE-RELATION "on", whose FIGURE is the cat, and whose GROUND (the thing the cat is on) is the table. "node3" corresponds to the COMPLEMENTIZER that, which requires no further description.

The scene description fragments may be derived from the dependency structure by semantic interpretation frames. The appropriate semantic interpretation frames may be found by table lookup, given the lemma of the word in question. These frames may differ depending upon what kind of thing the word in question denotes.

For nouns such as cat or table, an embodiment may use an electronic thesaurus, such as, for example, Wordnet®. The Cognitive Science Laboratory of Princeton University developed Wordnet®. Other electronic thesauruses may alternatively or concurrently be used. The thesaurus provides various kinds of semantic relations between words, the particular information of interest here being the hypernym and hyponym relations. Thus, the thesaurus may indicate, for instance, that cat is a mammal, or that table is a kind of furniture. The three-dimensional model may be keyed, indexed, or otherwise cross-referenced to the electronic thesaurus hierarchy so that a designation such as cat will retrieve a list of all cats, the designation table will retrieve a list of all tables, the designation animal will retrieve a list of all animals, and so forth. In an embodiment, the three-dimensional Viewpoint™ models have been keyed into the Wordnet® hierarchy. Other combinations of three-dimensional objects and electronic thesauruses may be used.

Thus, the semantic interpretation of nouns may be accomplished by finding the node in the electronic thesaurus hierarchy corresponding to the three-dimensional model of the word in question. If there is no such node (i.e., if the word does not correspond to a model in the three-dimensional model database) then a list consisting of just the word may be generated for the object description in the corresponding scene description fragment. For example, if there is no three-dimensional model for the word "bagel," then a list consisting of just the word "bagel" may be generated for the object description. Eventually, once the scene is rendered, the system may display as three-dimensional extruded text, the word "BAGEL" at the place in the scene where the bagel is to appear.

Noun scene description fragments may also contain information on whether the noun in question is plural, determined from a grammatical part of speech tag produced by the part of speech tagger discussed in the section entitled "Part of Speech Tagging and Parsing." In the embodiment described herein, "NNS" is the part of speech tag identifying plural nouns. An instance of plural marking appearing in a scene description fragment is shown below:

("node17"
  (:OBJECT ("caramel_apple-vp22054" "apple-vp8326"):SOURCE GET-INSTANCES:PLURAL T))

For personal names such as John, a list of male and female first names may be mapped, as appropriate, to one of a male or female three-dimensional humanoid figures. In an embodiment, two three-dimensional humanoid figures may be identified. "Mr. Happy" may be used to depict males, while "Mrs. Happy" may be used to depict females. Of course, other characters may also be available. Additionally, images may be mapped or added to the three-dimensional characters to depict any number of likenesses (e.g., celebrities, political figures, friends, pets).

Spatial prepositions such as on may be handled by semantic functions that look at the left- and right-dependents of the preposition, and construct a scene description fragment from these. The semantic entry for on is given below:

(semantics
  :genus "on"
  :funcs '(SEM-TIME-RELATION-ATTR SEM-STATIVE-RELATION-PRED SEM-STATIVE-RELATION-ATTR SEM-INTRANSITIVE-STATIVE-RELATION)

The semantic functions (:funcs) may be checked in sequence, with the first one that matches being allowed to construct the scene description fragment. SEM-TIME-RELATION-ATTR will match if the right-dependent of on is a time expression (e.g., Tuesday). SEM-STATIVE-RELATION-PRED will match cases where there is both a left-dependent and a right-dependent. SEM-STATIVE-RELATION-ATTR will match cases where there is no left-dependent but there is a head, for example, such a case is the cat on the mat, where cat is the head and on is the dependent. Furthermore, SEM-INTRANSITIVE-STATIVE-RELATION handles the case of intransitives, such as on as in John ran on. In an embodiment, these semantic functions are implemented as Common Lisp methods. However, other embodiments may implement the semantic functions as functions in some other programming language, or in any other computational method known to those of skill in the art.

Most verbs may be handled not by semantic functions, but rather may be handled by semantic frames. The semantic entry for say is shown below:

```
(SEMANTICS :TYPE NIL :GENUS say :SPECIES NIL
:FUNCS NIL
:VERB-FRAMES
((VERB-FRAME
   :NAME SAY-BELIEVE-THAT-S-FRAME
   :REQUIRED (SUBJECT THAT-S-OBJECT)
   :OPTIONAL (ACTIONLOCATION ACTIONTIME))
 (VERB-FRAME
   :NAME SAY-BELIEVE-S-FRAME
   :REQUIRED (SUBJECT S-OBJECT)
   :OPTIONAL (ACTIONLOCATION ACTIONTIME))
 (VERB-FRAME
   :NAME GIVE-FRAME-NP-TOOBJ
   :REQUIRED
   (SUBJECT-VOLIT
   DIRECT-OBJECT
   INDIRECT-OBJECT)
   :OPTIONAL
   (ACTIONLOCATION  INSTRUMENT  ACTIONTIME))
 (VERB-FRAME
   :NAME NP-V-NP
   :REQUIRED (SUBJECT DIRECT-OBJECT)
   :OPTIONAL
   (ACTION LOCATION
   INSTRUMENT
   ACTIONTIME))))
```

This semantic entry includes a set of verb frames, each of which defines the argument structure of one "sense" of the verb say. For example, the first verb frame identified as SAY-BELIEVE-THAT-S-FRAME, has as a required argument a SUBJECT and a THAT-S-OBJECT, or in other words an expression such as that the cat is on the table. Optional arguments include an action location (e.g., John said in the bathroom that the cat was on the table) and an action time (e.g., John said yesterday that the cat was on the table). Each of these argument specifications may cause a function to be invoked. The function may check the dependencies of the verb for a dependency with a given property, and assign such a dependency to a particular slot in the scene description fragment. For example, the THAT-S-OBJECT argument invokes a function that finds a dependent whose lemma is that and whose grammatical category is SBAR, and assigns it to the direct object slot of a scene description fragment that corresponds to a verb.

Note that in the scene description below:
("node1"

```
(:ACTION "say":SUBJECT "node2":DIRECT-OBJECT
   ("node3" "node5" "node4" "node7"):TENSE-ASPECT
   "PAST":SOURCE   "VF:SAY-BELIEVE-THAT-S-FRAME"))
``` the DIRECT-OBJECT actually consists of several nodes: "node3", "node5", "node4", and "node7". This is an example of a list of nodes in the scene description corresponding to all elements of the embedded sentence that the cat is on the table. This may be provided as a convenience for the depiction algorithms described in the section entitled "Interpretation of the Scene Description into a Three-Dimensional Image."

The next frame SAY-BELIEVE-S-FRAME handles sentences such as, for example, John said the cat is on the table (i.e., without that). The frame GIVE-FRAME-NP-TOOBJ handles sentences such as, for example, John said "bonjour" to Mary. The frame NP-V-NP handles sentences such as, for example, John said "bonjour".

In addition to semantically interpreting words that denote particular objects, actions, or relations, an embodiment may also interpret anaphoric or coreferring expressions. Simple pronominals like he or she, may be interpreted by searching through the context to find an appropriate coreferent (where appropriate may include matching on, for example, number and gender features).

Nouns can also corefer, as in the following example:
John said that the cat was on the table. The animal was next to a bowl of apples.

While it is not strictly required that the animal denote the cat mentioned in the first sentence of the above example, the coherence of the discourse depends upon the reader or listener making that connection. In an embodiment, such associations may be handled by noting that in the thesaurus's hierarchy, the denotations of cat are a subset of the denotations of animal, and computing that the noun phrase might corefer with the previously mentioned cat. In the case of multiple sentences, a list of scene descriptions may be returned and passed to a depiction module as described below in the section entitled "Interpretation of the Scene Description into a Three-Dimensional Image."

Consider again the following example sentences:
"John said that the cat was on the table. The animal was next to a bowl of apples."

In an embodiment, two scene descriptions may be generated; a first scene description for the first sentence and a second scene description for the second sentence. Each scene description, as discussed earlier, may include multiple scene description fragments. In the second scene description, the object corresponding to the animal, may be described by a list of possible animals from a set of three-dimensional models; the object also may contain an annotation for a POSSIBLE-COREFERENT. In this example, the POSSIBLE-COREFERENT would be the node corresponding to the cat. Thus, the description module (see section entitled Interpretation of the Scene Description into a Three-Dimensional Image) may make use of POSSIBLE-COREFERENT information. Instead of adding a new animal and putting it next to a bowl of apples, the description module may put the already existent cat next to a bowl of apples.

The following is one possible example of a scene description for the sentence: "The animal was next to a bowl of apples."

```
(("node12"
   (:OBJECT
     ("pig_baby-vp1356" "calf-vp1322" "owl-vp11719"
      "eagle-vp1334" "bird_standing-vp1316" "atlantic_puffin-vp13720" "albatross-vp11963" "penguin-
```

"vp1354" "penguin-vp7324" "duck-vp1331" "black-swan-vp11716" "ostrich-vp11975" "bird-vp21815" "toucan-vp11967" "chicken-vp3952" "sparrow-vp21210" "manta_ray-vp13438" "shark-vp24472" "mandarin_fish-vp14306" "sea-horse-vp23288" "angelfish-vp13793" "marlin-vp1353" "goldfish-vp3982" "piranha-vp6615" "salmon-vp23287" "mandrill_male-vp13724" "baboon-vp7801" "chimp-vp2577" "cat-vp2842" "cheetah-vp7811" "tiger-vp1364" "lion_standing-vp1350" "panda-vp11862" "dog_standing-vp5041" "dog_sitting-vp5092" "dog-vp23283" "doberman-vp5851" "republican_elephant-vp21783" "elephant-vp1338" "walrus-vp13713" "dolphin-vp6421" "rabbit-vp23286" "bunny-vp1320" "beaver-vp13721" "rat-vp6423" "chipmunk-vp7813" "rhinoceros-vp7819" "zebra-vp11968" "horse-vp815" "horse-vp1347" "donkey-vp24215" "camel-vp4014" "giraffe-vp11957" "deer_mule-vp3614" "caribou-vp13722" "goat-vp2183" "bull-vp13525" "cow_jointed-vp2234" "bison-vp7807" "night_glider-vp13892" "kangaroo-vp40097" "platypus-vp13726" "frog-vp4411" "fetus_20-week-vp2870" "pterodactyl-vp1811" "diplodocus-vp1805" "stegosaurus-vp1812" "triceratops-vp1818" "allosaurus_jointed-vp5489" "brontosaurus-vp8099" "snake-vp24586" "turtle-vp40115" "turtle-vp2230" "starfish-vp4144" "earthworm-vp11587" "snail-vp13117" "octopus-vp11731" "shell_nautilus-vp40105" "squid-vp23290" "dragonfly-vp21170" "grasshopper_south_african-vp12855" "beetle_hercules-vp12649" "beetle_silver-vp24543" "ant-vp5536" "butterfly-vp14800" "fly-vp13014" "mosquito-vp4767" "crab-vp12487" "crawfish-vp11867" "lobster-vp21752" "spider-vp21211" "scorpion_imperial-vp12520")
:SOURCE GET-INSTANCES: POSSIBLE-COREFERENT "node5"))
("node11"
 (:STATIVE-RELATION "next to" :FIGURE "node12": GROUND "node15":STRUCTURAL-SOURCE "node13":SOURCE STATIVE-RELATION-PRED))
("node15"
 (:OBJECT ("bowl-vp41903" "fruit_bowl-vp24864"): SOURCE GET-INSTANCES))
("node16"
 (:STATIVE-RELATION "of" :FIGURE "node15": GROUND "node17":STRUCTURAL-SOURCE "node16": SOURCE STATIVE-RELATION-ATTR))
("node17"
 (:OBJECT ("caramel_apple-vp22054" "apple-vp8326"):SOURCE GET-INSTANCES :PLURAL T)))

The scene description above illustrates another property of scene descriptions, namely that they may be only partly specified as to the precise semantic relation expressed by the elements. Note "node16", for the stative relation of, which relates bowl and apples. This gives essentially no information about the relation between bowl and apples, other than the fact that they are related. The depiction module handles the relation—in this case that the apples are in the bowl rather than, say, on top of the bowl.

Interpretation of the Scene Description as a Three-Dimensional Scene Depiction Module Overview Returning to FIG. 2, at step 58, the high-level scene description, generally as described above, may be passed to a Depiction Module for interpretation of the high-level scene description as a three-dimensional scene. The output of the Depiction Module may be a low-level three-dimensional scene description, such as a low-level scene description in Virtual Reality Modeling Language (VRML) format, or a low-level scene description in any format acceptable to any number of three-dimensional rendering packages or video games, or a rendered three-dimensional image, generally representative of the originally entered text.

Figure 4:
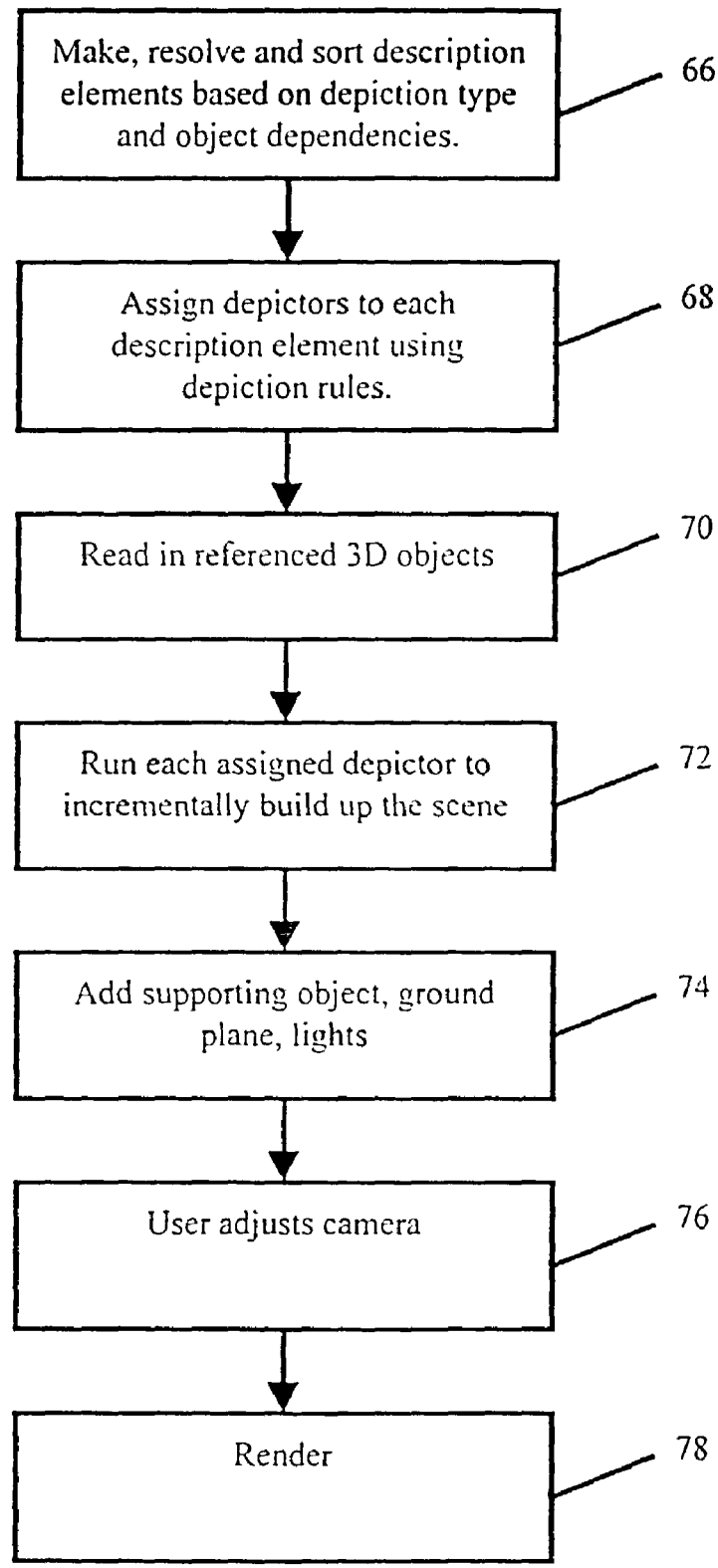
FIG. 4 is a flow diagram of an embodiment of a depiction module.

FIG. 4 is a flow diagram of the operations that may occur within the Depiction Module. At step 66, description elements may be made, resolved, and sorted based on depiction type and object dependencies. Description elements may be thought of as represent the meaning of the originally entered text; description elements generally correspond to the nodes in the high-level scene description generated by the linguistic module. At step 68, depictors may be assigned to each description element using depiction rules. At step 70, referenced three-dimensional objects may be read into memory. At step 72, each assigned depictor may be run to incrementally construct a scene. At step 74, supporting objects, ground planes, and lights may be added. At step 76, a user may adjust the viewpoint from which the user views the final rendered three-dimensional image. At step 78, the image may be rendered. It is understood that steps may be combined or the order of steps may be altered without departing from the scope of the invention. Each of the above-identified steps are more fully described below.

Description Elements, Depictors, and Depiction Rules

The linguistic analysis may provide a high-level scene description (hereinafter a "scene description"). A scene description may include a list of nodes (see, for example, the scene description for the sentence: "The animal was next to a bowl of apples."). Each node may be considered a description element. Each description element has a type, which may represent various component meanings inherent in the input text. Examples of description element types may be, for example, OBJECT, ACTION, ATTRIBUTE, STATIVE-RELATION, TIMESPEC, CONJUNCTION, POSSESSIVE, NEGATION, and CARDINALITY. Other description element types may also be available. Additionally each different type of description element may have an object to which it refers. For example, in an embodiment, a STATIVE-RELATION has a FIGURE and a GROUND. In the previous example using the sentence: "The animal was next to a bowl of apples.", a STATIVE-RELATION is node16, which has a FIGURE, which is node15, which is the OBJECT bowl, and a GROUND, which is node17, which is the OBJECT apple.

Depictors may be sets of objects and sets of parameters, which may be applied to them. That is, depictors may be considered as parameterized objects. The depictors may include the reference of the objects to be modified, the parameters to be used in modifying the objects, and the set of procedures for the modification. A depictor may, for example, set the color of another object as in, for example, an ATTRIBUTE description element. Such a depictor may work by calling the software module that adds color to an object. A depictor may also modify the shape of an object, as for example, if the ATTRIBUTE "mangled" were to be used. As another example, a depictor may also make a character swing a baseball bat at a ball as in, for example, an ACTION description element.

Depiction rules may be assigned to description elements and may be used to generate a set of depictors for their assigned description element. The depictors may then be applied in sequence to actually create the scene. In other words, the set of constraints imposed by the depictors may be solved to achieve a satisfactory low-level scene description. The set of depiction rules may be extensible.

Depiction rules may be assigned by first matching the description element type (e.g., ACTION, ATTRIBUTE, OBJECT) and then a particular instance of the scene description. For example, instances of ACTION may be "run" or "throw," an instance of ATTRIBUTE may be color, and an instance of OBJECT might be to portray the noun government as an image of the U.S. Capitol Building. There can be many depiction rules for a given description element and instance. After matching a set of depiction rules, each candidate depiction rule may have a filter applied to it. This filter may be identified by the word "TEST". TEST may be a piece of code that tests conditions from the entirety of the description. TEST may compute, for example, whether a certain action is appropriate for an object.

In the first example below, the depiction rule will be considered if either of the actions "kick" or "punt" are depicted. Furthermore, this particular depiction rule is an example of a depiction rule that might be used when there is no path or specified trajectory. An example of a sentence that indicates no path or specified trajectory might be John kicked the ball, as opposed to John kicked the ball over the fence. This exemplary depiction rule also checks to see that there is a direct object (in this case "ball") and that the size of the direct object is larger than four feet. If the object is smaller than four feet, then a second, possibly less restrictive, depiction rule may be used. Of course, the parameters evaluated by the depiction rule may be changed without departing from the scope of the invention.

```
(define-depiction (:action ("kick" "punt") "in place")
  :test (and (not opath)
    direct-object
    (>(find-size-of direct-object) 4.0))
  :fobjects (list (make-pose-depictor "kick":actor subject)
    (make-spatial-relation-depictor "behind" subject direct-object)))
(define-depiction (:action ("kick" "punt"))
  :fobjects (make-path-verb-depictor subject t 3.0 "kick ball" direct-object opath
  :airborne-figure-p t))
```

The function MAKE-PATH-VERB-DEPICTOR, used in the second depiction rule above, creates a set of depictors that depict objects on paths. MAKE-PATH-VERB-DEPICTOR depicts the subject of the sentence "subject", determines if the subject is to be displayed as being upright "t", places the subject three feet behind the object (i.e., the ball) "3.0", uses the "kick ball" pose, and makes the object airborne. Using depictors, any number of complex objects can be depicted. Attributes may also have depiction rules. Examples of such depiction rules follow. This list is meant to be illustrative and not restrictive. Other depiction rules are possible.

If an object is described as, for example, "huge", the object may be scaled from its default size by a factor of four. Other scaling factors are, of course, available. If an object is described as, for example, "spinning," a spinning icon object (e.g., an arrow curling in a circle) may be situated above the object to suggest spinning motion. It may also be possible to depict motion by causing the object to rotate about an axis. Note that in the example code below, "descriptor" indicates a "description element."

```
(define-depiction (:attribute "huge")
  :fobjects (list object)
  :fdepict (3d:scale-local object 4.0))
(define-depiction (:attribute "spinning")
  :descriptor-role :relation
  :fobjects (list (find-object "spinning icon") object)
  :fdepict (let ((figure (first (get-objects descriptor)))
    (ground (second (get-objects descriptor))))
    (stack-up figure ground :use-surfaces-p nil
      :extra-space
      (find-height-of ground))
    ;; if the object is repositioned, the spinning icon must
    move with it
    (attach-for-depiction figure ground)))
```

In the example below, TEST computes if the specified attribute is a color. If so, the function COLORIZE-OBJECT is called to change its the object's color. FIND-COLOR-VALUES identifies if the color is defined in a database of colors.

```
(define-depiction (:attribute nil)
  :test (find-color-values descriptor-name)
  :fobjects (list object)
  :fdepict (loop for i in (listify object)
    do (colorize-object i descriptor-name)))
```

In the example below, the test computes if the specified attribute is a facial expression (e.g., "smile"). If so, it calls the function GOTO-FACIAL-EXPRESSION on the object (usually a human head) to change its shape appropriately.

```
(define-depiction (:attribute nil "facial expressions")
  :fobjects (list object)
  :test (when (and object descriptor-name) (find-facial-expression object descriptor-name))
  :fdepict (goto-facial-expression object descriptor-name))
```

Generating Depictors

Depiction rules may be used to generate depictors for description elements. Depictors may be responsible for the instantiation of a description element. For example, a depictor for the action "eat" might, when applied, place a three-dimensional character in a pose to appear as if the three-dimensional character was holding a spoon to its mouth. Note also that more than one depictor may be assigned to a single description element. For example, the action of "John throws the ball to Mary." might generate depictors that could generically be expressed as follows:

1. John is in an overhand-throwing pose, holding a ball.
2. John is facing Mary
3. Mary is facing John—TENTATIVE
4. John is 10 feet behind Mary—TENTATIVE Transduction Rules These may be used to modify a set of description elements and/or depictors based on some criteria. In an embodiment, after having assigned depictors to each description element, transduction rules may be applied to find conflicts and add implicit constraints.

Conflicts

In the example above, depictors 3 and 4 are labeled as "TENTATIVE". This indicates that the depictor in question might be used to set a default; other depictors (from other depiction elements) may override that default. For example, if the input text was "John throws the ball to Mary. John is on the porch. Mary is on the sidewalk." then depictor 4 would be overridden by depictors that put John on the porch and Mary on the sidewalk.

Constraint Satisfaction

Objects may sometimes be multiply constrained. For example, consider "The plate is to the left of the fork. The plate is to the right of the napkin." If the plate is moved in the sequence presented by the two preceding sentences, then the plate will first be put to the left of the fork and then to the right of the napkin. Additionally, if there is no specification as to where the fork or napkin is initially placed, an unpredictable result is likely. Multiple constraints can be resolved by maintaining previously enforced constraints. In other words, the first constraint may be identified and maintained when the second constraint is implemented. So, in one embodiment, the constraint that the plate is to the left of the fork is maintained when the plate is subsequently moved to the right of the napkin, thus causing the fork to move with it. Other, more sophisticated, constraint satisfaction methods can also be used.

Implicit constraints. Implicit constraints are those constraints which may be imposed on objects because of the objects' usage in the context of the entered text. Consider the sentences: "The lamp is on the table. The glass is next to the lamp." It may be preferable not to have the glass floating in the air next to the lamp. Instead, the glass would preferably be put on the table. Therefore, an implicit constraint may be implemented which provides that "If X is next to Y, and X is not already on a surface, and X is not an airborne object (e.g., a helium balloon), then place X on the same surface as Y." Other implicit constraints may additionally be implemented.

Figure 18:
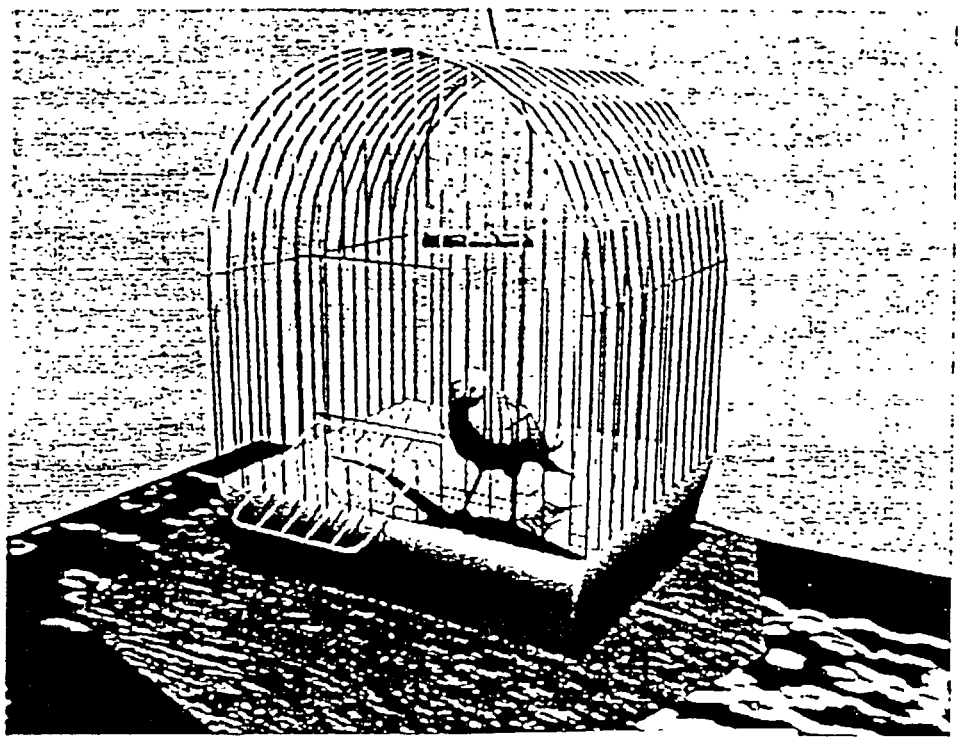
FIG. 18 is an example of a rendering of the text: "The bird is in the birdcage.

FIG. 18 is an illustration 132 of one possible rendering of the sentence "The bird is in the birdcage." In this scene, the implicit constraint concerning the objects bird and birdcage might be that the bird is placed so that its feet are on the floor of the birdcage. Therefore, in this example, the "enclosure" spatial tag for the birdcage and the "base" spatial tag for the bird would be identified and the bird's base would be placed on the floor of the birdcage's enclosure.

Figure 19:
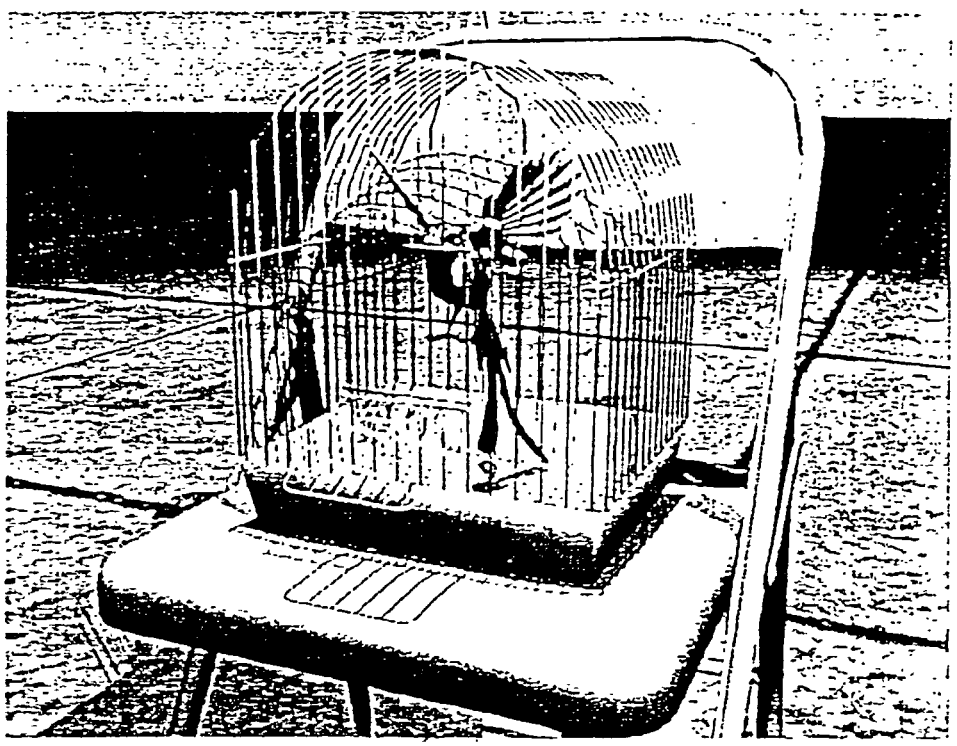
"
FIG. 19 is an example of a rendering of the text: "The bird is in the birdcage. The birdcage is on the chair.

FIG. 19 is an illustration 134 of one possible rendering of the sentences "The bird is in the birdcage. The birdcage is on the chair." This rendering illustrates the implicit constraint as applied to the positioning of the bird within the birdcage and as applied to the positioning of the birdcage on the chair.

Object Database

3D Models. A three-dimensional object library may, for example, include models for air transport, anatomy, animals, architecture, characters, geography, ground transport, household, industrial, military, miscellaneous, occupational, space, sports and hobbies, vegetation, and water transport. This listing in meant to be illustrative and not limiting. In one embodiment the Viewpoint Digital™ "Gold" library of pre-defined three-dimensional polygonal models are used. An online listing of these models can be found at www.viewpoint.com. Types of models other than polygonal models may be used; for example non-uniform rational B splines (NURBS) may be used without departing from the scope of the invention. Furthermore, it may be possible to use three-dimensional models from other suppliers and to combine models from multiple suppliers. Additionally, it may not be necessary to use every object modeled in a given library. For example, in one embodiment approximately 1,200 three-dimensional models, out of approximately 12,640 are utilized.

The three-dimensional object database may be extensible, therefore, in addition to pre-defined three-dimensional models, users can add their own models to the database. A user may model his or her own models using a program such as Mirai™. In addition to the three-dimensional data, an embodiment may associate additional information with each three-dimensional model.

Parts. These may be named collections of faces, or surfaces, on the models that represent certain regions. For example, the headlights, roof, and windshield of a car might be different parts.

Color Parts. These may be sets of parts to be colored. Color parts may be used when the model is specified by the text as having a particular color. Therefore, for example, for the blue flower, the petals of the flower could be colored blue, not the stem. If no color parts are specified, then the largest part may be colored.

Opacity Parts. These may be parts which get a default transparency (e.g., the glass part of a framed window).

Default size. All objects may be given a default size. The default size may be expressed in a common unit of measure, for example feet.

Spatial Tags. Spatial tags may be areas on and around objects used to spatially arrange and juxtapose objects together. The spatial tag may be marked with a space-filling three-dimensional object, representing the borders of the spatial tag. Spatial tags may be used when depicting, for example, the "in" or "on" spatial relationship. FIGS. 5 through 13 illustrate some spatial tags.

Figure 5:
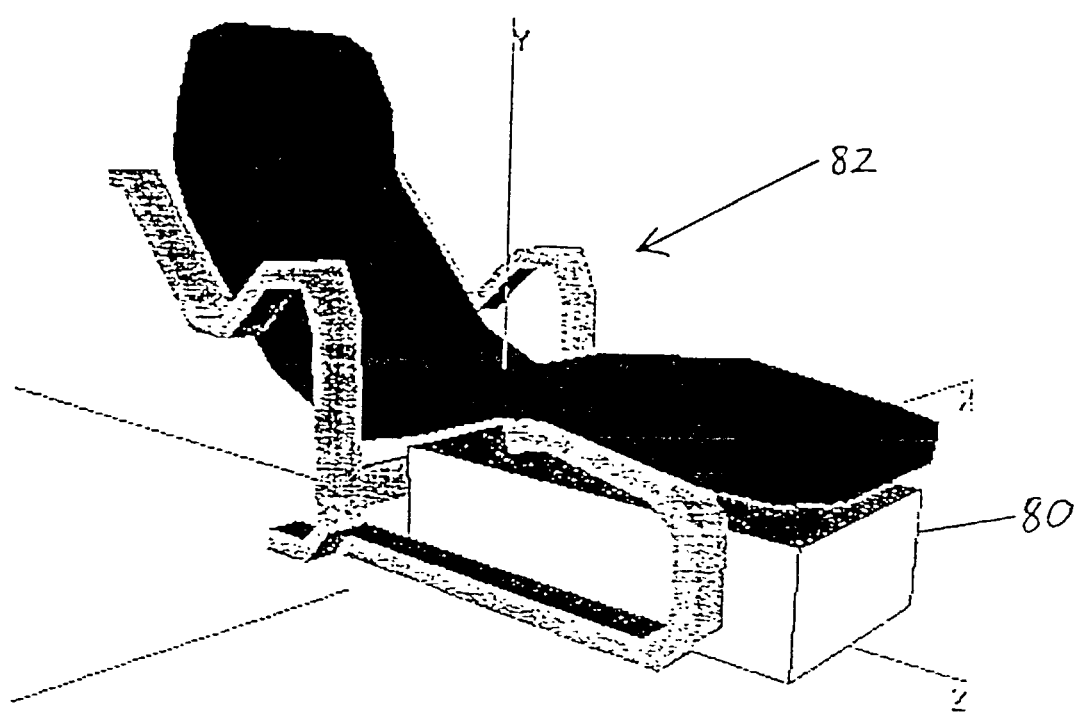
FIG. 5 is an illustration exemplifying a "canopy area.
Figure 6:
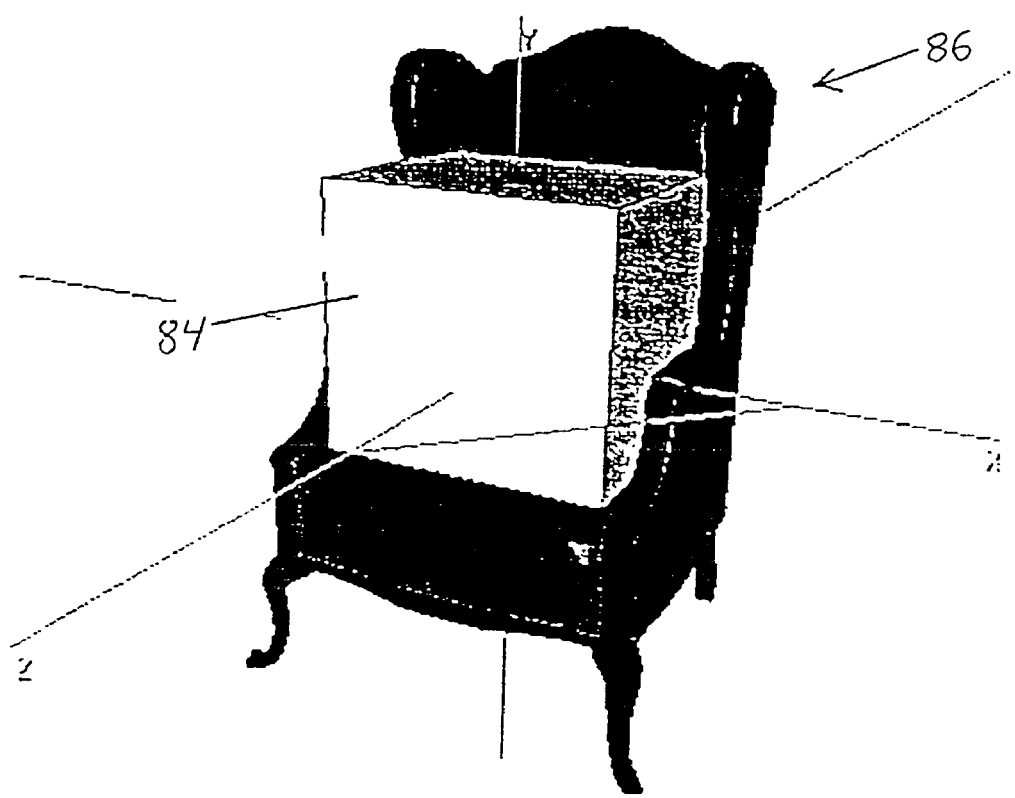
"
FIG. 6 is an illustration exemplifying a "top surface.
Figure 7:
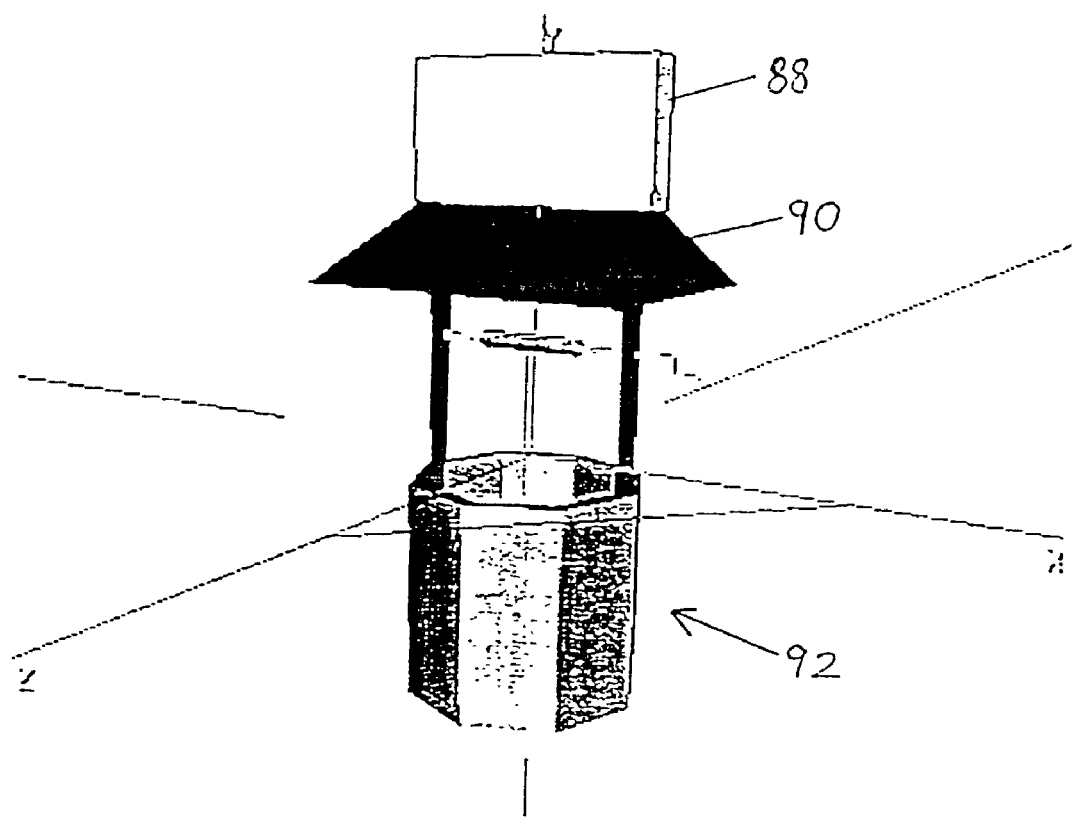
"
FIG. 7 is an illustration exemplifying a "ridge.
Figure 8:
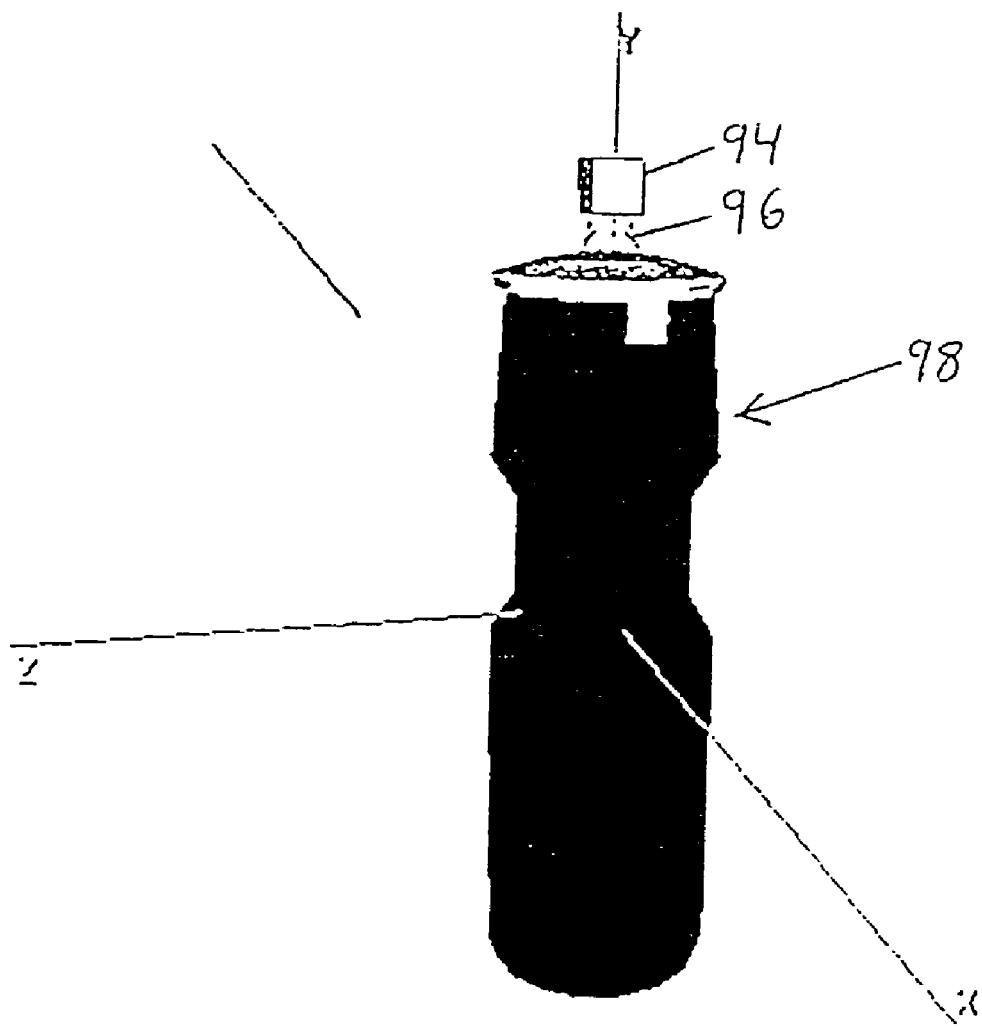
"
FIG. 8 is an illustration exemplifying a "peak.
Figure 9:
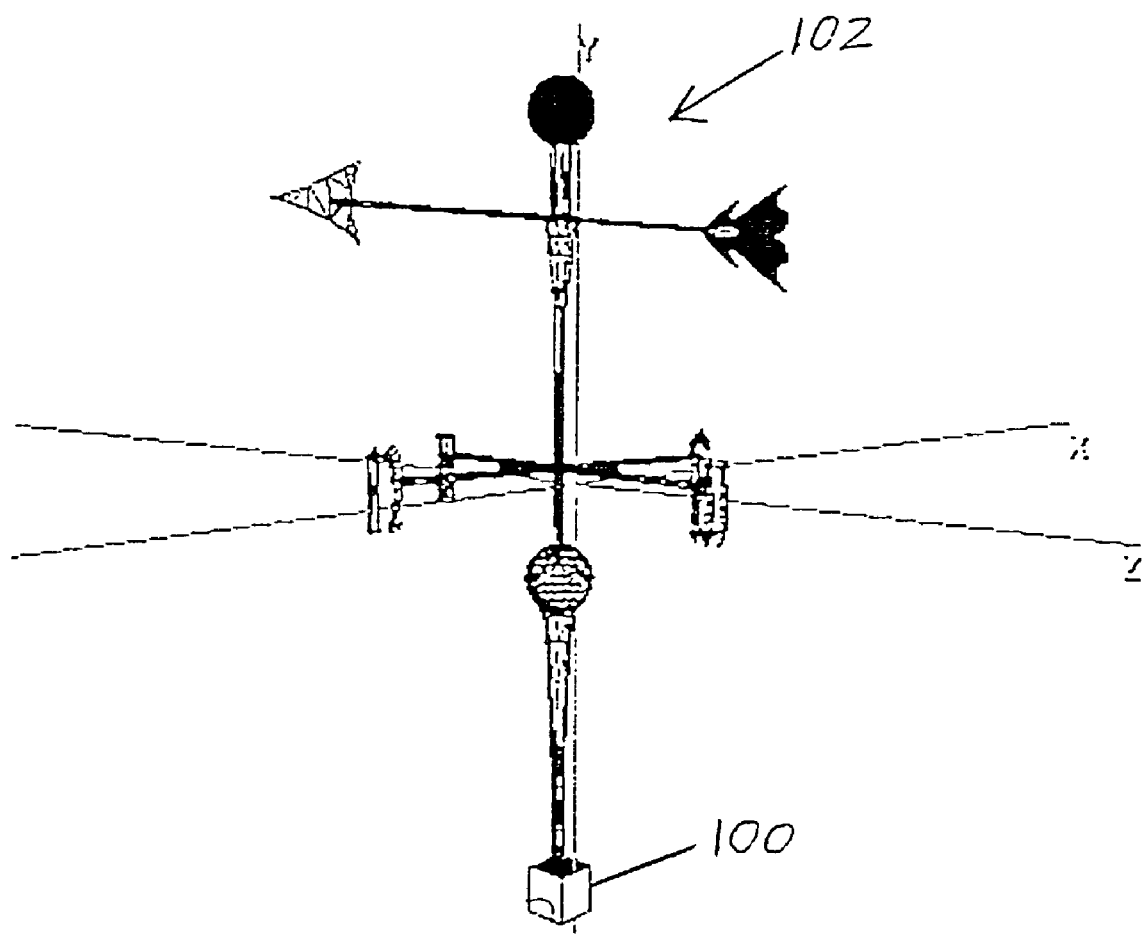
"
FIG. 9 is an illustration exemplifying a "base.
Figure 10:
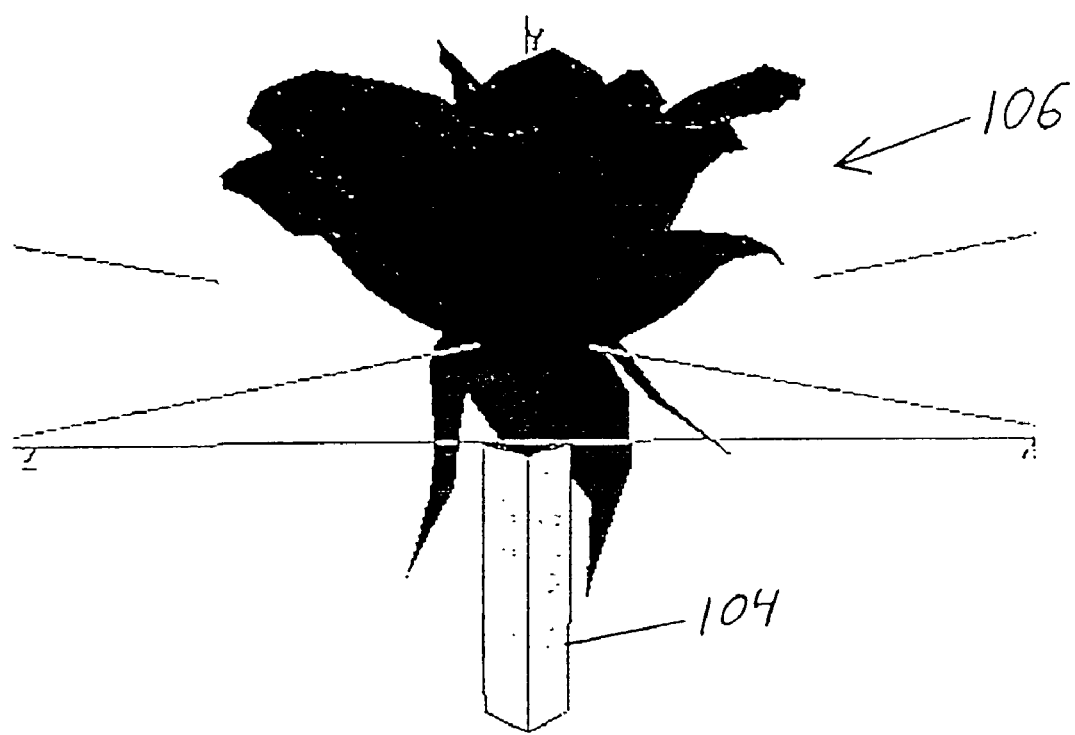
"
FIG. 10 is an illustration exemplifying a "stem.
Figure 11:
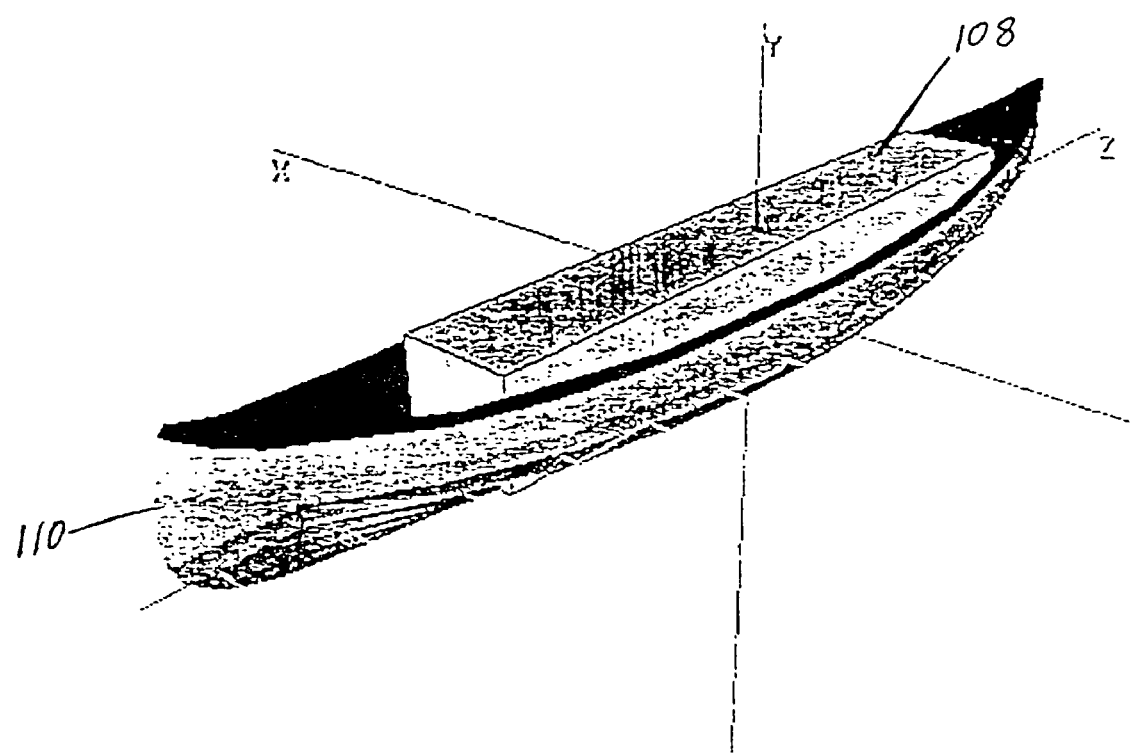
"
FIG. 11 is an illustration exemplifying a "cup.
Figure 12:
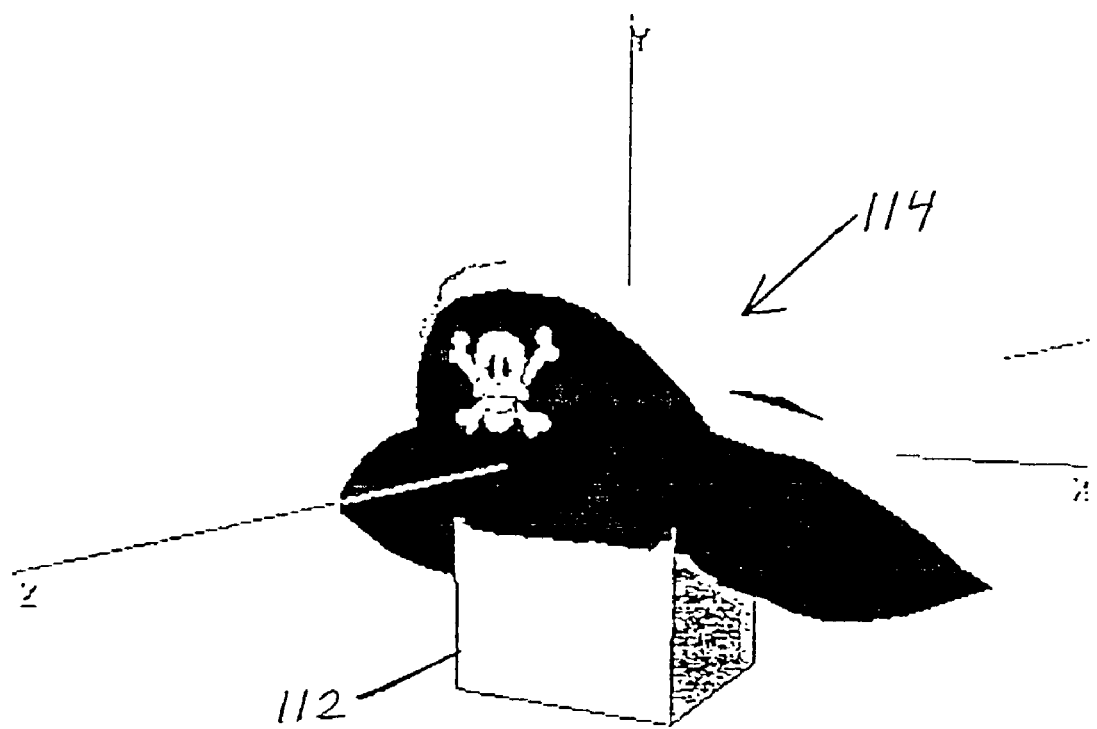
"
FIG. 12 is an illustration exemplifying a "cap.
Figure 13:
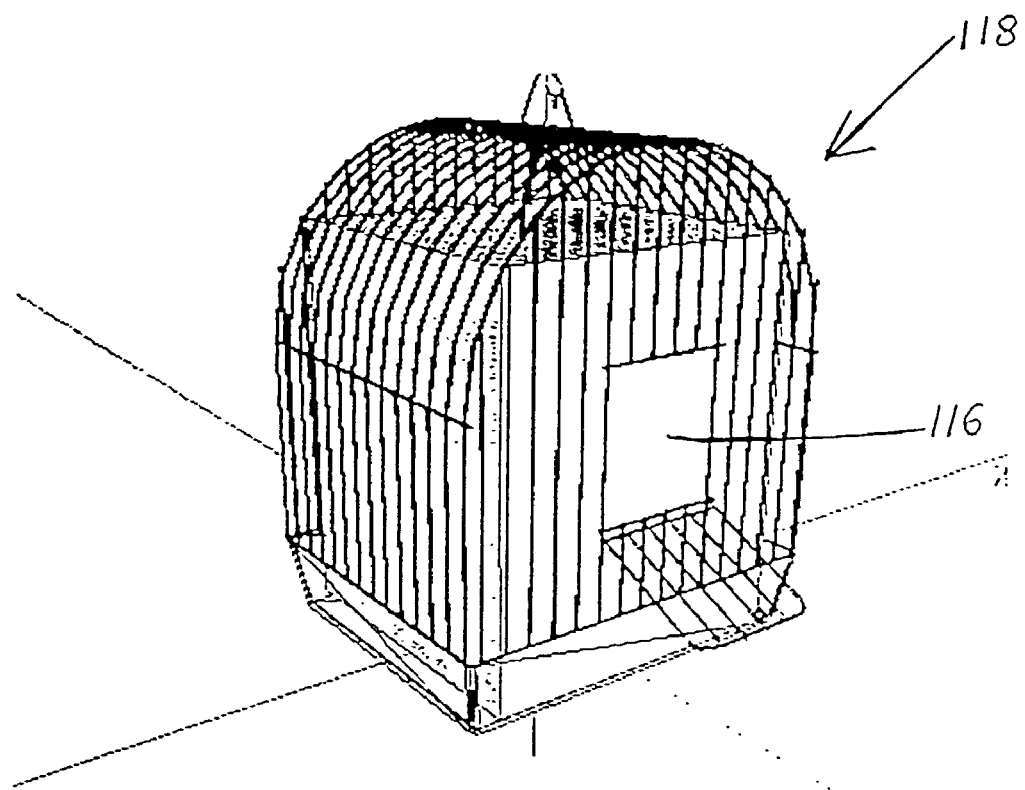
"
FIG. 13 is an illustration exemplifying an "enclosure.

FIG. 5 is an illustration exemplifying a "canopy area" 80, which in this illustration is the area under the substantially horizontal portion of a lounge-type chair 82. FIG. 6 is an illustration exemplifying a "top surface" 84, which in this illustration is the area substantially directly above the seat of a chair 86. FIG. 7 is an illustration exemplifying a "ridge" 88, which in this illustration is represented as the lengthwise edge substantially directly above the crest of the roof 90 covering a well 92. FIG. 8 is an illustration exemplifying a "peak" 94, which in this illustration is a point having a substantially zero cross-sectional area and lying substantially directly above the spout 96 of a water bottle 98. FIG. 9 is an illustration exemplifying a "base" 100, which in this illustration is the area at substantially the lower-most point of a weather vane 102. FIG. 10 is an illustration exemplifying a "stem" 104, which in this illustration is the area typically associated with the stem of a flower 106. Other examples of a stem include, for example, a stick on a lollipop, or a vertical support for a stop sign. FIG. 11 is an illustration exemplifying a "cup" 108, which in this illustration is the area substantially enclosed by the outline of a canoe 110. FIG. 12 is an illustration exemplifying a "cap" 112, which in this illustration is the area substantially below and surrounded by the portion of a pirate's hat 114 wherein the wearer's head would be located. FIG. 13 is an illustration exemplifying an "enclosure" 116, which in this illustration is the area substantially bounded by the interior of a birdcage 118. Of course, it will be recognized that spatial tags may be associated with objects other than those exemplified in the above listed illustrations. For example, the interior area of the ashtray functions as a "cup" to contain whatever is placed into the ashtray. Additionally, the above list is not meant to limit the number or type of spatial tags. There may be other types of spatial tags, for example a spatial tag indicating a "wall" may provide a surface upon which to push an object. For example, a car may have a wall along the outside surface of its trunk to enable a character to push the car by pushing on the wall of the trunk. A wall spatial tag may also be used to position an object on a vertical surface, such as when a character hangs a picture on a wall.

Functional Properties. These may be properties used by the depiction rules to determine if an object can behave in a given way. For example, all objects that function as land vehicles might be marked as such. Then the depiction rule for the verb "ride" may select among these to choose a vehicle, as for example, in the sentence John rides to the store. The list of functional properties may be open. The list of functional properties may be stored in one or more databases. The list below is illustrative of the features being marked in one embodiment. However, the list below is only a small fraction of those features that may be used by the depiction rules:

:HARD :SOUR :TRAIN :SALTY :SEPARATOR :COLD-WEATHER-THING :CONDUIT :TROPICAL MONEY :FLATTENER :SIGNAL :HOUSEHOLD-ITEM :SUBMARINE :GENERATOR :POKER :PATH :CONVEYER :TERRAIN :TRAP :CUTTER :SOFT :TABLE :BEAUTIFUL :SEAT :PUSHER :CONTROLLER INSECT :MIXER :PORTAL :MOUTHWARE :RECORDER :SUCTION :LIFTER :PUSH-VEHICLE :LIGHT-SOURCE :FOOT :ALARM :ROLLER :POINTY :SIGN :DINOSAUR :TRUCK :HOUSEWARE :TARGET :HEAT-SOURCE :COLD :SWITCH :DEFUNCT :TRIGGER :HAT :PLANT :BED :PROJECTILE :FURNITURE :CELEBRITY :SCARY :FRUIT :TREE :LOCATION :SLIPPERY :HUMAN :MARKER :DISPLAY :RECEPTOR :METER :WET :SUPPORT :WEAPON :GUN :MUSICAL-INSTRUMENT DESTROYER :SOUND-SOURCE :VEHICLE :BUILDING :MONUMENT :SWEET :GRIPPER :FISH :HOT :SURFACE :HITTER :SOURCE :DECORATION :UGLY :BIRD :INFORMATION :TABLEWARE :COLORFUL :TOY :CELEBRATORY :GROUNDPLANE :TERRAIN :CONNECTOR :DANGEROUS :GENERIC :CAR :HEAVY :AIR-VEHICLE :GUARDIAN :UNKNOWN :EXOTIC :CATCHER :VEGETABLE :CONTAINER :BASIN :SINK :CHAIR :VIEWER :BOAT :FLOWER :GAMEWARE :FOOTWARE :DEVICE :SHIELD :PART :FOOD :ANIMAL :TOOL :CLEANER :BODYWARE

Rendering Attributes. Other visual properties of objects can be represented, like shininess, overall transparency, etc.

Shape displacements. Some objects, like human faces, can change shape (e.g., smiling, eyes closed, frowning, etc.). These shape displacements may be associated with the object and may be used to depict emotions or other states of the object.

Spatial Relations

Spatial relations may be depicted using the spatial tags, as discussed above, of associated objects. Some examples:

For The bird is on the cat, we find a "top surface" tag for the cat and a "base" tag for the bird. Preferably, the cat's top surface is on its back and the bird's base is under its feet. Identification of the spatial tags allow the bird's feet (base) to be positioned on the cat's back (top surface). If, for example, the base is too big to fit on the top surface, it could be scaled.

For The cat is under the chair, a "canopy" tag for the chair is identified and the cat may be positioned substantially within the boundary of the canopy spatial tag. If, for example, the cat is too large to fit, then either the cat can be scaled or the chair can be put on the back of the cat.

Figure 14:
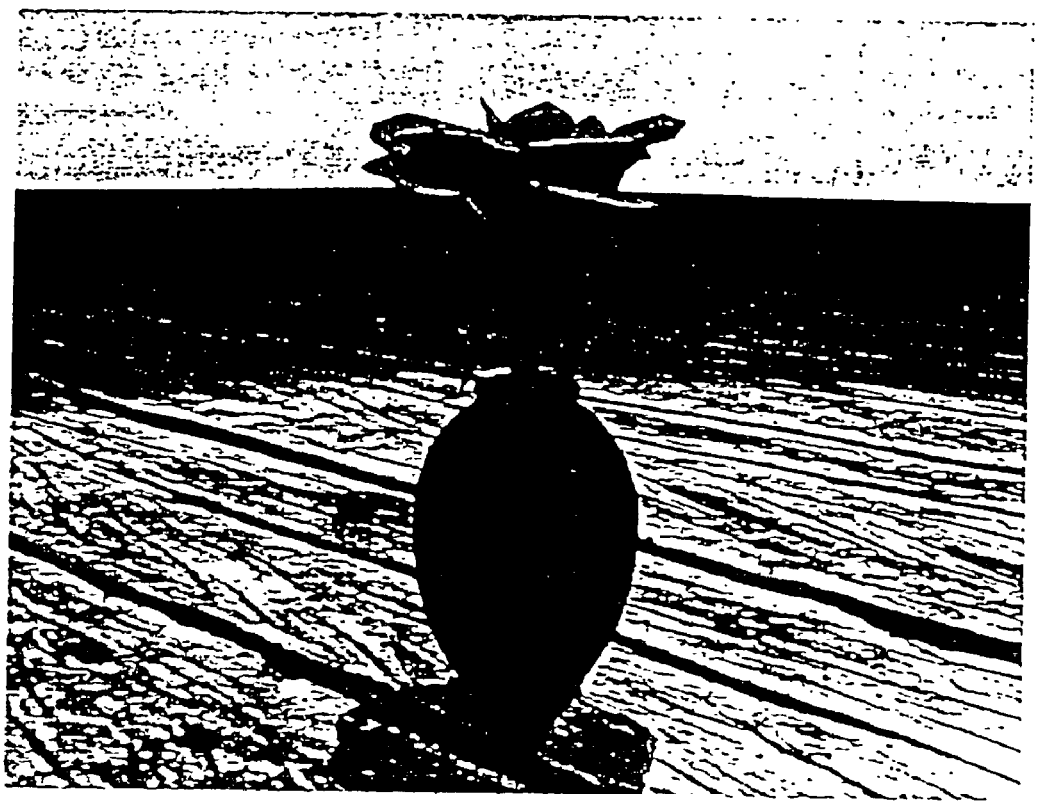
"
FIG. 14 is an example of a rendering of the text: "The rose is in the vase.

FIG. 14 is an illustration 120 of one possible rendering of the sentence "The rose is in the vase." In this rendering, the "cup" tag for the vase and the "stem" tag for the rose would be identified and the rose's stem would be placed within the vase's cupped opening.

These examples are not meant to be an exhaustive list, but rather to illustrate the manner in which spatial tags may be used to depict spatial relations.

Poses and Templates

In three-dimensional (3D) graphics, human characters are usually represented by a 3D mesh (skin) overlaying a bone control structure. Each vertex in the skin is typically linked to a bone, so that when that bone moves, that part of the skin will move correspondingly. The bones are typically configured in a tree structure, starting with a "root," usually between the hips. Each bone typically has a length and a rotation angle, representing the bone's orientation with respect to a parent bone. The total set of bone lengths and rotations is typically called a pose. When the bones are configured into a given pose, the skin may be automatically moved into the corresponding configuration.

An extensible library of poses for actions such as, for example, "jump," "give," and "carry" may be used in an embodiment of the invention. In one embodiment, over two hundred such poses are used; the number may grow to the thousands and beyond. The notion of poses may be extended to not only consist of poses associated with a humanoid skeleton but also poses associated with the relative size and placement of a set of associated objects. Associated objects may be classified as, for example, "instruments," "targets," and "fixtures," however, other associated objects are also possible.

Figure 15:
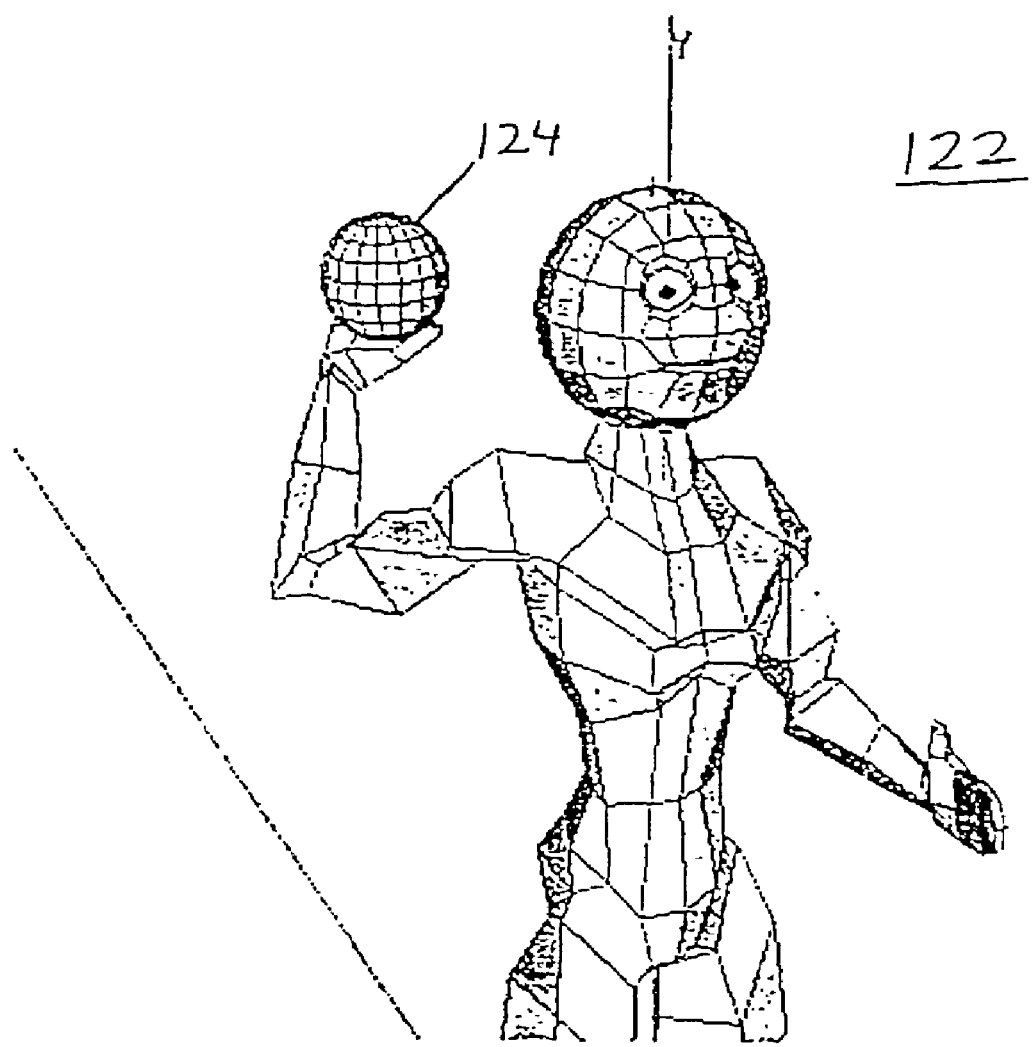
"
FIG. 15 is an illustration exemplifying a "throw ball" pose.

A pose template can be thought of as a representation of a specific form of an action or other description. Therefore, for example, the pose template "swing bat at ball" may represent a humanoid form swinging a representation of a baseball bat at a spherical object representing a baseball. The baseball is the target; the bat is the instrument. These associated objects (e.g., target, instrument, etc.) may be used to make object substitutions in the depiction module. The depiction module will be discussed below. Pose templates can also involve more than one humanoid form, as in for example, a swordfight. FIG. 15 is an illustration 122 of the "throw ball" pose template.

Figure 16:
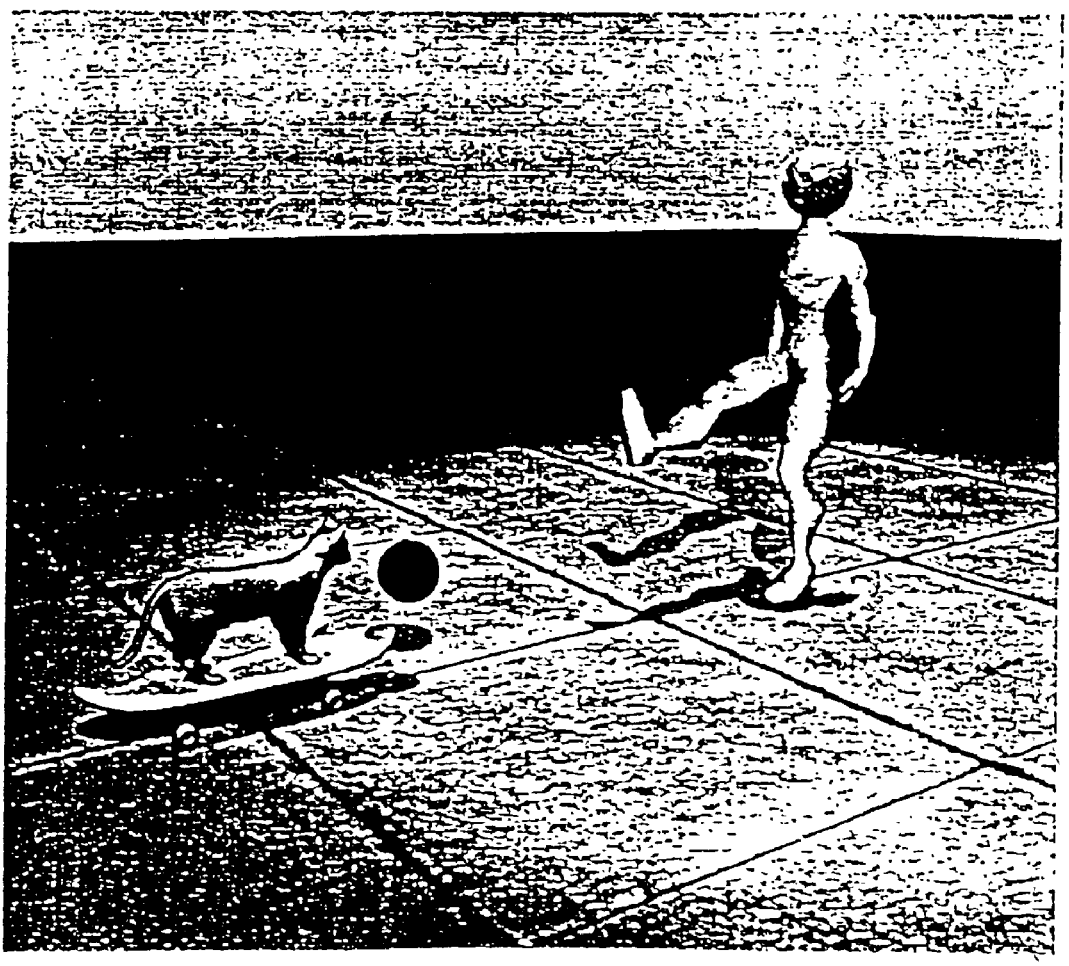
FIG. 16 is an example of a rendering of the text: "John kicks the bowling ball to the cat on the skateboard.

Pose template substitution. The associated objects in pose templates may be represented by generic objects and sets of constraints. Therefore, for example, in the "throw ball" pose template of FIG. 15, a generic sphere 124 represents the ball. If the input sentence is "John threw the watermelon", a watermelon would be substituted for the generic sphere 124. The watermelon can either be substituted as-is, or scaled to approximately the same size as the generic sphere 124. Each pose template may specify whether to scale substituted objects, and if so, what constraints should be met. For example, the position of the substituted object can be manipulated so that the bottom of each object rests on the same plane. FIG. 16 is one possible rendering 126 of a sentence using a kick pose: "John kicks the bowling ball to the cat on the skateboard."

Partial poses. Some poses involve the entire object. Others may require only a portion of an object. Therefore, partial poses may be used when one part of an object acts independently of another part of the object. Partial poses may also be combined. For example, a humanoid form running primarily uses the lower body in its pose. In addition, throwing may only require the upper body to be in a pose. Therefore, throwing a ball while running may be depicted by combining the two partial poses. Partial poses need not be restricted to upper and lower halves of an object. A partial pose may be used, for example, to present various poses for a hand on an arm, where the hand acts independently of the position of the arm.

Inverse Kinematics. Inverse kinematics (IK) is a 3D graphics technique for specifying the position of an end effector point) of a skeleton and having other bones automatically adjust their angles to reach that position. The typical example is moving the wrist to a target position with IK which causes the elbow and shoulder joints to rotate in the right ways so the wrist reaches the destination. This technique may be used in an embodiment to make characters point and look at objects. IK may be more flexible than poses because the target objects do not have to be in a predetermined place. The skeleton will point at any target.

Figure 17:
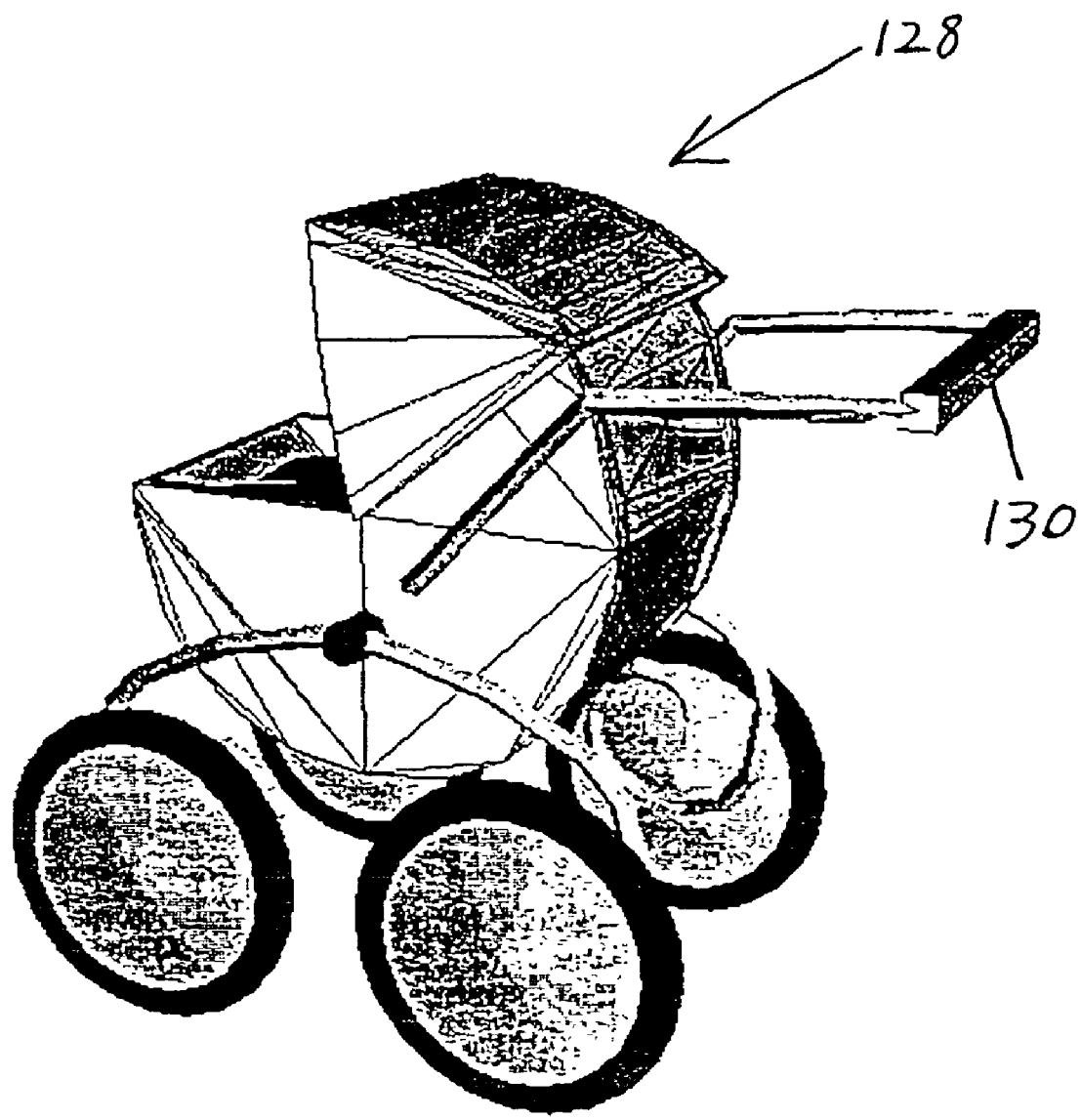
"
FIG. 17 is an example of an image of a baby carriage with a tagged handle.

IK can also be layered on top of existing poses to make the character's body position better correspond with other objects in the environment. An example is with the pose for "push." Consider pushing a lawnmower, a car, or a baby carriage. Because the various objects have handles and surfaces at different heights, no single body pose can cover them all. (The hands need to touch the correct part of the object.) To take care of this, the character may first be put behind the object in a generic push pose appropriate for that type and size object. Then the hands may be moved using inverse kinematics to the handle or surface of the object. Note that this technique assumes the "push surface" or "handle" of the object is tagged so that the target position for the IK can be specified. FIG. 17 is an image of baby carriage 128 with a tagged handle 130.

Environment/Setting

The environment or setting of the scene may be specified by the entered text. If specified, an embodiment may depict the environment or setting. Such an environment or setting might also be considered as a background upon or in which the text is portrayed. Consider, for example, the sentence: "John walked through the forest" In this example, the environment or setting of the scene is a forest. The environmental database 38, of FIG. 1, may be used to supply environments or settings.

However, there may be no explicit environment or setting. Consider, for example, the sentence: "The flower is blue." Rather than depicting a blue flower floating on a page, it may be possible to supply an optional background setting. In the simplest case, this may be a ground plane and/or a supporting object. For more visually complex cases, it may be preferable to include more detail in the environment or scene. For example, an embodiment may put the flower in a vase on a fireplace mantle in the middle of a fully decorated living room.

Abstract Relations

Figure 20:
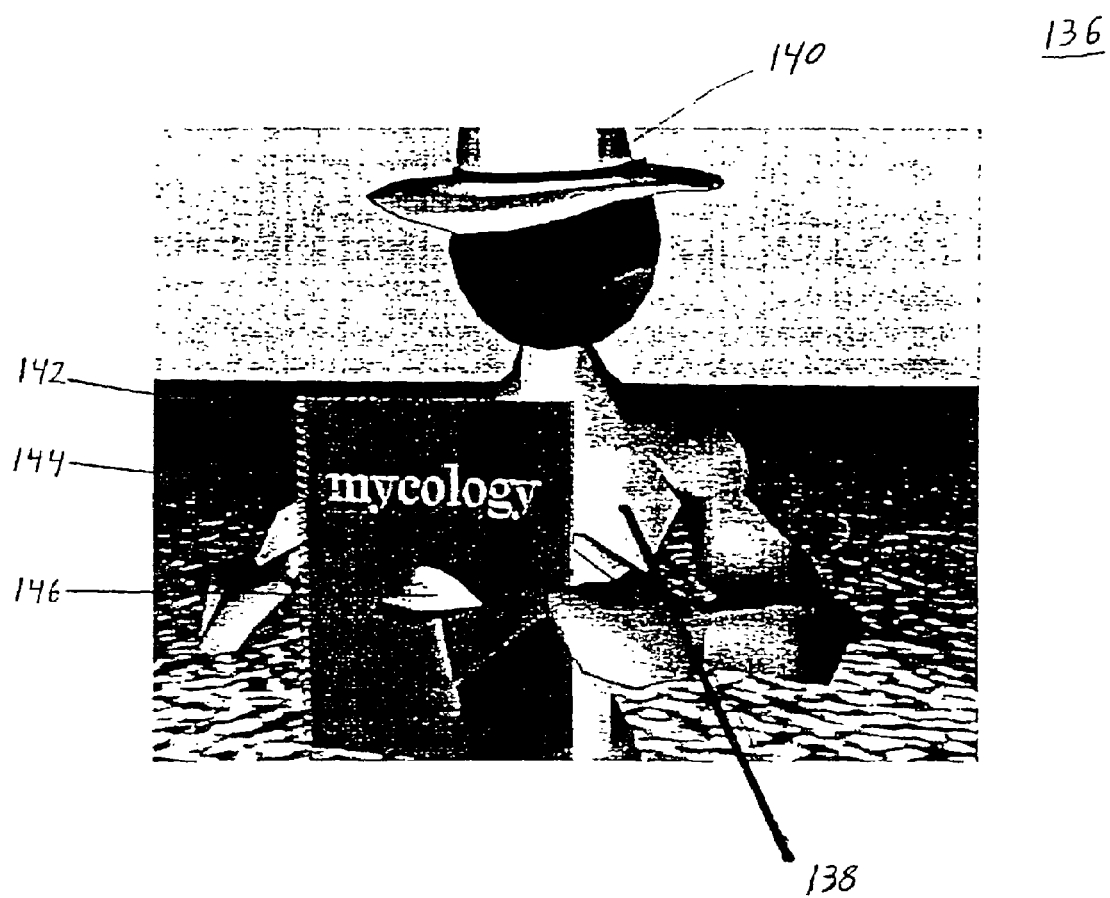
"
FIG. 20 is an example of a rendering of the text: "The cowboy is studying mycology.

Scenes generated from input text are not limited to those scenes that may be directly depictable; abstract relations may also be depicted. FIG. 20 is one possible example of a rendered image 136 of the sentence: "The cowboy is studying mycology." The idea of a "cowboy" may be represented by a male humanoid FIG. 138 wearing a cowboy style hat 140. The idea of "studying" may be represented by, for example, the humanoid FIG. 138 holding an open book 142. A book having a cover bearing the word "Mycology" 144 might, for example, represent the idea of the study of mycology. An image of a mushroom 146 may additionally be displayed on the book's 142 cover.

Figure 21:
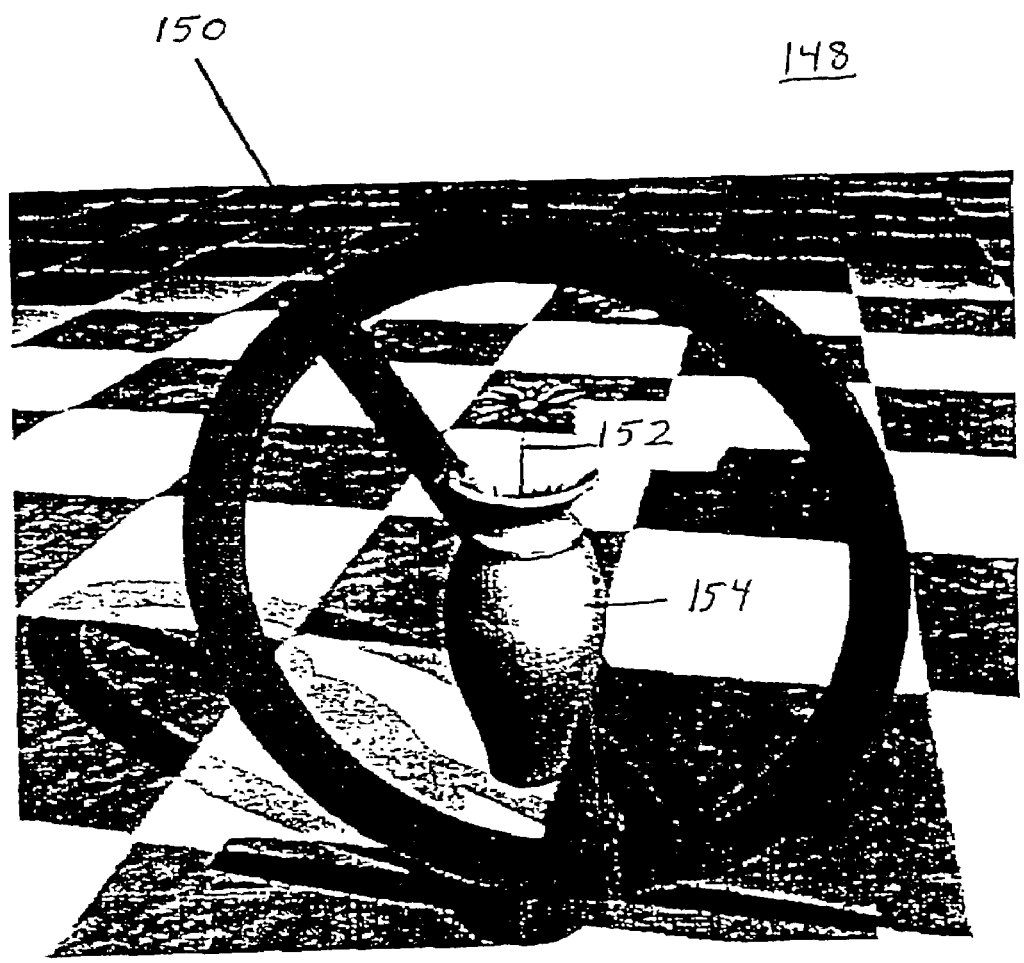
"
FIG. 21 is an example of a rendering of the text: "The blue daisy is not in the vase.

The concept of negation may also be represented. FIG. 21 is one possible example of a rendered image 148 of the sentence: "The blue daisy is not in the vase." Negation may, for example, be represented by the superimposition of a circle with a diagonal line 150 over the image of a blue daisy 152 in a vase 154.

The above listing of abstract relations is not meant to be exclusive. Other abstract relations may be depicted without departing from the invention herein.

Cardinality

Figure 22:
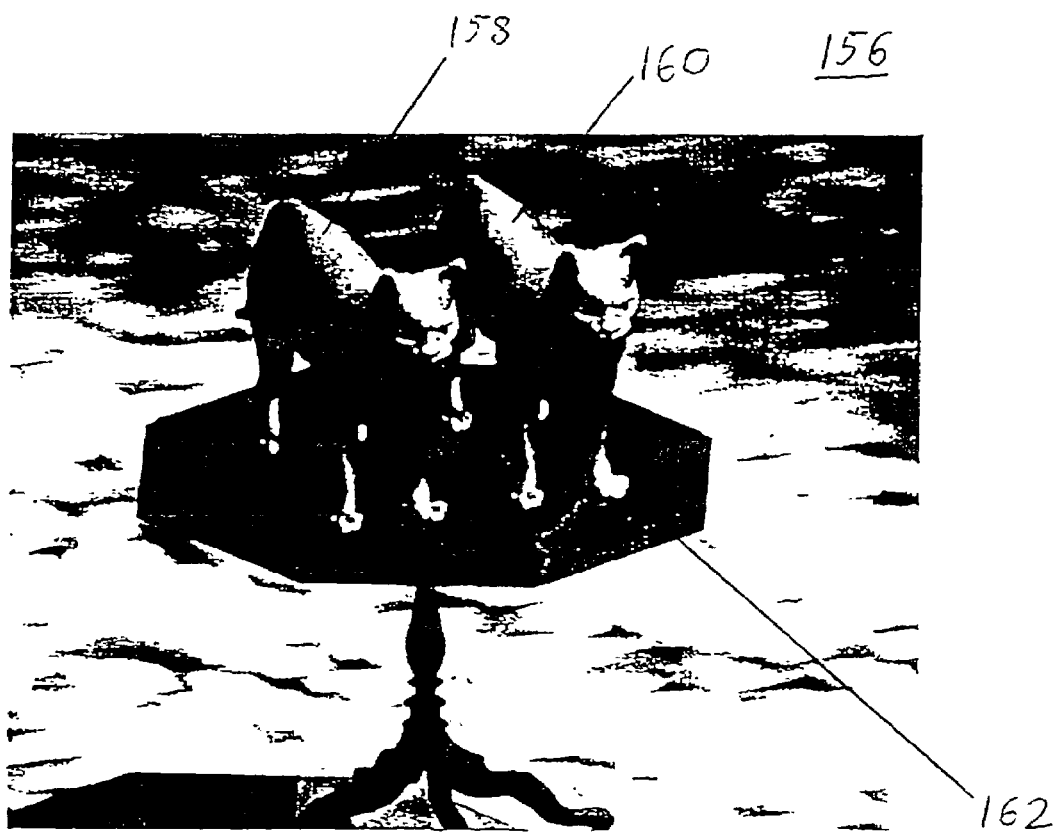
"
FIG. 22 is an example of a rendering of the text: "The two cats are on the table.

The concept of cardinality may also be represented. FIG. 22 is one possible example of a rendered image 156 of the sentence: "The two cats are on the table." Placing a first cat 158 next to a second cat 160 on a table 162 represents the concept of cardinality, the number of elements in a given set.

Recursive Substitution

A scene may be generated and recursively placed into a second scene. As an example, consider the sentences "John said that the cat was on the table. The animal was next to a bowl of apples." An embodiment of the system might construct a first scene of a cat on a table, the cat being next to a bowl of apples. The system may compute a likelihood that a bowl of apples on a table is likely to be in a kitchen. The first scene may therefore be illustrated in a kitchen, with the cat and bowl of apples on the kitchen table. The embodiment might construct a second scene of a male character having a speech bubble pointing toward his mouth. The first scene could be recursively inserted into the second scene to depict the sentences just considered. Other applications of recursive substitution are also available.

Rendering Images

After a three-dimensional scene description has been generated, a three-dimensional image can be rendered using any number of three-dimensional rendering programs. A large number of rendering packages are available to do this. For example, graphics cards and game consoles can do this in real time, techniques such as ray-tracing, which can incorporates shadows and diffraction, may also be used. Thus, a scene description generated by the system may be converted to a low-level scene description of, for example, the VRML type and then applied to a rendering package. Of course, the scene description generated by the system may alternatively be converted to a low-level scene description of a type suitable for input to a video game. Other conversions to other types of low level scene descriptions are, of course, also available.

Though not properly part of scene creation, to render a scene, the scene needs to be illuminated. This may be done by illuminating objects from different directions using virtual light sources.

Viewing Perspective

A user of the system may choose a camera position, or viewing perspective, from which to render the scene. Alternatively, heuristics may be added to automate the viewing perspective.

Potential Uses

A Text-to-Scene system may be integrated into any other system (e.g., any other software). In an embodiment, the system may be integrated into a three-dimensional video type game, such as a game on a Sony PlayStation 2®, or may be integrated into the firmware of the computer running the game. A user might enter text into the game in order to have the embedded system, for example, create a new room having user-described lighting and environment or a new object having user-described attributes. The newly created images might become part of the game. Databases, such as those for three-dimensional models, might be accessed via a communication network, such as the Internet or an intranet. In another embodiment, the system might be used as an aid in foreign language interpretation. A user might enter text into the system in the foreign language and view the scene that the user has described. If the user were to use the language incorrectly, or were to use unintended words, then the user would be able to determine that the image generated was not the image the user intended. In another embodiment the system might reside on the Internet and be used to create, for example, greeting cards representative of the text entered by a user. Of course, the system may be used in many ways other than those listed here, without departing from the scope of the invention.

Inferring the Environment in a Text-to-Scene Conversion System

There has been some work performed over the past decade on inferring semantic information from text corpora. However, this past work was directed toward extracting semantic information per se. The method described herein provides more than semantic information, more than just the meaning of the word; it provides a real-world knowledge of the environment within which the word is used. In particular, given a description of a particular action, e.g., John was eating breakfast, the method described herein may be used to derive where John is likely to be, what time of day it is, and so forth. Humans on hearing this sentence would probably form a mental image of someone in their kitchen, perhaps in their dining room, seated at a table, eating a meal in the morning. But note that the sentence omits all of this information. It does not provide information about the location of the action or the time of day. Nonetheless, humans would usually make these inferences about the environment in which the particular action occurs.

The text-to scene conversion system, as described above, converts text into three-dimensional models that represent that text. The system performs syntactic and semantic analysis on input text and produces a description of the arrangement of objects in a scene. A model is then generated from this scene description.

As described above, one embodiment of the invention may operate as follows: An input sentence may first be parsed and converted into a dependency representation. Then lexical semantic rules may be applied to this dependency representation to derive the components of the scene description. For instance the verb throw could invoke a semantic rule that constructs a scene component representing an action (ultimately mapped to a pose) where the left-hand noun phrase dependent represents an actor, the right-hand noun phrase dependent a patient, and some dependent prepositional phrases the path of the patient.

The depiction module can interpret the scene description to produce a set of low-level depictors representing poses, spatial relations, color attributes etc. Transduction rules may be applied to resolve conflicts and add implicit constraints. The resulting depictors may then be used (while maintaining constraints) to manipulate the 3D objects that constitute the final, renderable 3D scene.

One problem that arises in such a system is how to derive the large amount of knowledge that is needed in order to give reasonable depictions. Consider the sentence: John was driving to the store. In understanding this sentence; and visualizing what it means, a human would probably assume that John was in the driver's seat of a car, on a road, possibly passing buildings, and so forth. Many of these inferences are defeasible: the inference about the road, for example, may be canceled by altering the sentence to read: John was driving to the store across the muddy field. Without such explicit cancellation, however, the inferences seem robust.

To take another example, consider the sentence: John ate his dinner at 7. A human may assume that the time is 7 in the evening (possibly near twilight), that the subject is in a room, such as a dining room or a kitchen (or possibly in a restaurant), and that the subject is seated at a table. Alternatively, if the sentence read: John was eating breakfast, a human might assume that it is morning, and that John is in his kitchen or dining room. Finally, if the sentence read: John is shoveling snow, a human might assume that the season is winter.

Some of this knowledge is represented in the text-to-scene system as part of a word's meaning. For example, in an embodiment, the depiction phase described above is programmed such that when the word drive is encountered, the driver should be using some sort of vehicle. The depiction phase will select an appropriate vehicle and place the driver in the driver's seat. However, other common sense human knowledge is more tenuously linked: if John is washing his face, he is probably in a bathroom, but need not be: there is nothing in the meaning of wash face that implies a bathroom.

An important problem is how to acquire this kind of knowledge. One approach would of course be to do it by hand, possibly making use of already hand-built ontologies. However, a new and useful alternative, as presented herein, would be to extract information about the environment from text corpora.

The method disclosed herein makes use of likelihood ratios to extract, from a corpus of text, strong associations between particular actions and associated environments (e.g., locations, times, among other things) within which the actions occur. As used herein, a "corpus of text" is a collection of writings that need not be related in subject matter.

Method of Inferring the Environment from Text Corpora

Figure 23:
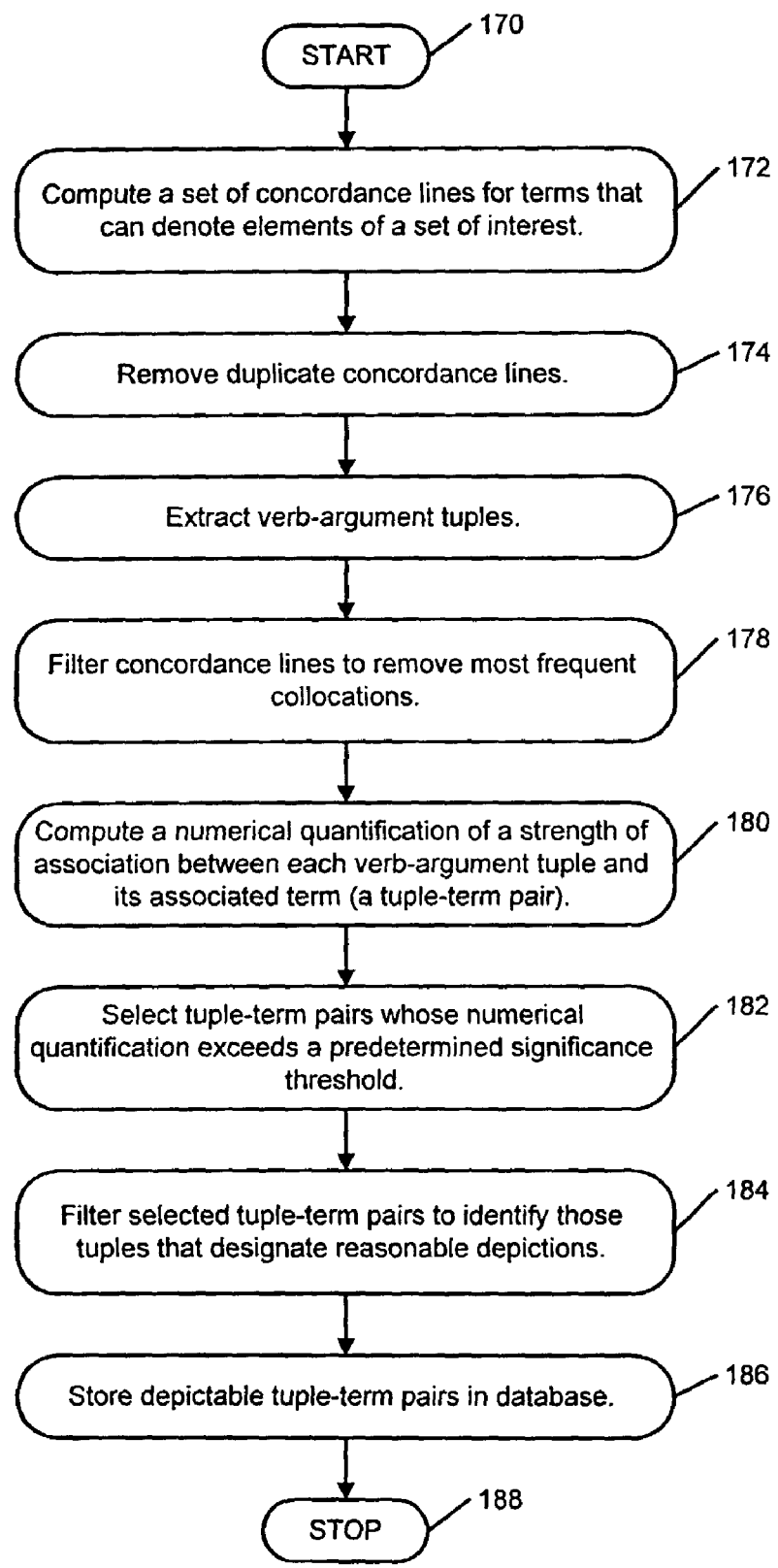
"
FIG. 23 is a flow diagram of a method for inferring the environment in a text-to-scene conversion system in accordance with an embodiment of the invention.

FIG. 23 is a flow diagram indicating one embodiment of a method for inferring the environment in a text-to-scene conversion system. The method may result in the generation of a database of verb-argument tuples and associated terms, where the verb-argument tuples represent the most likely actions associated with the terms. In one embodiment, the database may supplement environmental database 38 (FIG. 1). As used herein, a "tuple" refers to a set of two or more elements. For example, a verb-argument tuple may include two, three, or more words. Also, note that as used herein, the term "tuple" is used synonymously with the term "verb-argument tuple." Thus, references to a "tuple" comprise references to "verb-argument tuples" of two or more words.

In one embodiment, the method may start at step 170. At step 172, a set of concordance lines for terms that can denote elements of a set of interest may be computationally extracted from input corpora. As is known in the art, a "concordance" refers to an index of words in a corpus, showing every contextual occurrence of the word. A concordance line represents a line of text (not necessarily a sentence) which includes the indexed word bounded by some number of words that preceded and followed in the context of the word's location in the corpus. The set of interest may be, for example, a set of all rooms that could be found in a house. This set of interest may be important to describe the environment of activities that can take place in the various rooms of the house. For example, concordance lines may be computed for terms like kitchen, living room, dining room, hallway, laundry room and so forth. Elements of a set of interest are, of course not limited to rooms of a house. The terms in the concordance lines may describe any aspect of the environment of a scene. For example, a description of an aspect of the environment of a scene may be denoted by a name of: a location, an occupied space, an unoccupied space, a room, a time of day, or a season, among other things.

While any corpora may be used as the basis for generation of the concordance lines, those of skill in the art will recognize that the corpus selection will have an impact on the utility and completeness of the database of verb-argument tuples and associated terms. In practice, the corpus may include any number of words of text. Experiments have been conducted using a corpus of about 415 million words of English text, comprising about nine years of the Associated Press newswire, the Bible, the Brown corpus (H. Kucera and W. Francis, *Computational Analysis of Present-Day American English*, Brown University Press, 1967), *Grolier's Encyclopedia*, about 70 texts of various kinds published by Harper and Row, about 2.7 million words of psychiatry texts, a corpus of short movie synopses, and 62 million words of the *Wall Street Journal*.

Each word of text in a concordance line may be tagged with a part of speech using a part of speech tagger. The tagging may occur before or after generation of the concordance line.

Consider a corpus comprised only of the text of the 1996 *Associated Press* newswire. Sample concordance lines for various rooms from this corpus are given in Table 1, below. In Table 1, the part of speech information has been omitted for readability.

departing from the scope of the invention. For example, a robust chunk parser, such as that disclosed in S. Abney, "Partial parsing via finite-state cascades," in Workshop on Robust Parsing (J. Carroll, ed.), pp. 8-15, Prague: ESSLLI, 1996, may be used. Some verb-argument tuples and associated environmental terms are shown in Table 2. The contents of Table 2 were extracted from Table 1 for purposes of explanation.

TABLE 2

Some verb-argument tuple-term combinations extracted from Table 1.

| Verb-Argument Tuple | | | Term |
|---|---|---|---|
| asks | | amount | bedroom |
| happen | to | Tarkanian | kitchen |
| grounded | | parents | bedroom |
| telling | | parents | bedroom |
| didn't | | window | bedroom |
| replaced | by | house | bathroom |
| swimming | | pool | bathroom |
| born | in | home | bedroom |
| use | in | City | bedroom |
| lies | in | City | bedroom |
| equipped | with | microwaves | kitchen |
| allowed | in | rooms | kitchen |

TABLE 1

Sample concordance lines from the 1996 Associated Press newswire.

| | | |
|---|---|---|
| anything else, her books are about memories: | kitchen | memories, barnyard memories, family memories |
| both videotapes and photos of her in bathrooms and | bedroom | and asks for an unspecified amount of |
| will happen to Mr. Tarkanian," said Jack | Kitchen | , one of the NCAA's lawyers |
| grounded for telling his parents he didn't open his | bedroom | window. He confessed in |
| gone, replaced by a big house with five | bathroom | and an indoor swimming pool. |
| The second child was born in a | bedroom | of their home near Scottsdale after Corvin |
| beds in semiprivate rooms at one end of a | hallway | separated from the "older adult" |
| and the couple's 15-month-old son use a downstairs | bedroom | that lies in Granite City along with |
| of the halls, equipped with microwaves and other | kitchen | appliances not allowed in individual room |

The resultant data, as shown in Table 1, may be noisy. For example, in the third line, Kitchen is a family name, not a room in the house. Note that in one embodiment, each concordance line comprises a window of 40 words on each side of the indexed term (where the indexed terms in this example are kitchen, bedroom, bathroom, and hallway). Table 1, which is for exemplary purposes, presents concordance lines having a narrower window.

At step 174, duplicate concordance lines may be removed from the set of concordance lines. Any method of removal of duplicate concordance lines is acceptable. In one embodiment, the concordance lines are collected and sorted to assist in the removal of duplicates (newswire text especially contains many repeated stories).

At step 176, verb-argument tuples, such as verb-object (e.g., wash face) and verb-preposition-object (e.g., get into bed) tuples, are extracted. Unlike verbs alone, verb-argument tuples of this kind are usually good indicators of a particular action. Thus, whereas wash is consistent with many activities (e.g., washing one's self, washing one's car, washing clothes), a particular verb-object construction such as wash clothes is usually indicative of a particular activity.

In one embodiment, the verb-argument tuples are extracted using a simple matching algorithm that identifies verbal part-of-speech tags (which may be included in the concordance lines) and then searches for the end of the following noun phrase, with a possible intervening preposition. Other methods of extracting verb-argument tuples may be used without As illustrated in Table 2, the extracted data may be noisy and may include, for example, misanalysis (didn't window) and complex nominals that are not instances of verb-object constructions (swimming pool). Apart from misanalysis of the tuples, there are several instances where the term does not have the intended denotation. For example, a concordance line matching kitchen will not always have to do with kitchens. As noted above, Kitchen may be a family name, but a more common instance is that it is part of a complex nominal, such as kitchen knife. In such instances, the text is not generally talking about kitchens, but rather about kitchen knives, which can be used in rooms besides kitchens.

To remove such cases, at step 178, the concordance lines are filtered to remove the most frequent collocations, that is, the most frequent juxtapositions of words. In one embodiment, for example, the 200 most frequent collocations are removed.

In one embodiment, removal of common collocates is based on an assumption that a pair of words that occurs together frequently is likely to be a collocate. The specific frequency of occurrence is a design choice. Of course, identification of collocates may be made based on other criteria, or other assumptions, or may be identified by any algorithm known to those of skill in the art, without departing from the invention disclosed herein. For example, concordance lines could be filtered by extracting compounds like "living room" from online thesauruses or dictionaries (e.g. WordNet: Christiane Fellbaum, editor. WordNet: An Electronic Lexical Database, MIT Press, Cambridge, Mass., 1998), and then using those lists to remove collocates from the concordance lines. As one example, the words "living room" may be filtered because it is more likely to be the compound noun "living room", than a verb object construction.

Examples of collocations include compounds such as "dog house" or "living room" or "kitchen knife". Thus, in one embodiment, a collocation is a group of two or more words that belong together in that they are used with a clearly defined and often idiosyncratic meaning. For example, a "living room" is not a room where one lives, but rather a particular room in a house with certain expectations about what kinds of things one will find in it (e.g., sofas, chairs, lamps); similarly a "dog house" is not just anywhere a dog sleeps, but a particular kind of structure used for housing dogs. On the other hand, a sequence of words such as "pink horse" is not a collocation since it has no special significance and the meaning of the whole can be derived from the meanings of the parts. While the various examples of collocations shown above are noun compounds, collocations are not limited to noun compounds.

At step 180, a numerical quantification of the strength of the association between each of the verb-argument tuples and its associated term is computed. In one embodiment, likelihood ratios are used to quantify the association. For example, the relative likelihood of two hypotheses concerning two events $e_1$ and $e_2$ may be computed. In one embodiment the hypotheses are as follows:

$$p(e_2|e_1)=p=p(e_2|\neg e_1) \quad \text{Hypothesis 1}$$

$$p(e_2|e_1)=p_1 \neq p_2=(e_2|\neg e_1) \quad \text{Hypothesis 2}$$

Hypothesis 1 indicates that the probability of $e_2$ occurring given $e_1$ is indistinguishable from the probability of $e_2$ occurring given something other than $e_1$: i.e., event $e_2$ is not particularly expected (or unexpected) given $e_1$. On the other hand, hypothesis 2 indicates that the probability of $e_2$ occurring given $e_1$ is distinguishable from the probability of $e_2$ occurring given something other than $e_1$: i.e., there is a difference in expectation, and that $e_2$ is dependent on $e_1$.

The probabilities p, $p_1$ and $p_2$ may be estimated by the maximum likelihood estimate as follows, where $c_1$, $c_2$, and $c_{12}$ are, respectively the frequency of $e_1$ (e.g., the tuple), of $e_2$ (e.g., the term) and of $e_1$ and $e_2$ co-occurring; and N is the size of the corpus:

$$p = \frac{c_2}{N},$$

$$p_1 = \frac{c_{12}}{c_1},$$

$$p_2 = \frac{c_2 - c_{12}}{N - c_1}$$

If a binomial distribution is assumed:

$$b(k;n, x) = \binom{n}{k} x^k (1 - x)^{(n-k)}$$

then the likelihoods of the two hypotheses, given the observed counts $e_1$, $e_2$ and $e_{12}$, can be computed as:

$$L(H_1)=b(c_{12};c_1,p)b(c_2-c_{12};N-c_1,p)$$

$$L(H_2)=b(c_{12};c_1,p_1)b(c_2-c_{12};N-c_1,p_2)$$

The logarithm of the likelihood ratio for the two hypotheses ("log λ") then reduces as follows:

$$\log \lambda = \log \frac{L(H_1)}{L(H_2)}$$
$$= \log L(c_{12}, c_1, p) + \log L(c_2 - c_{12}, N - c_1, p) -$$
$$\log L(c_{12}, c_1, p_1) + \log L(c_2 - c_{12}, N - c_1, p_2)$$

where:

$$L(k,n,x)=x^k(1-x)^{n-k}$$

Following T. E. Dunning, "Accurate methods for the statistics of surprise and coincidence," Computational Linguistics, vol. 19, no. 1, pp. 61-74, 1993 and C. Manning and H. Schutze, Foundations of Statistical Natural Language Processing, Cambridge, Mass.: MIT Press 1999, the fact that -2 log λ is asymptotically $X^2$ distributed, may be used to compute -2 log λ, rather than just log λ.

In an embodiment, a p value of 0.05 is assumed. Those of skill in the art will recognize that the value of 0.05 is a standard measure used in statistical processing and that other values may be used. The p value of 0.05 has a critical $X^2$ value of 3.84 for one degree of freedom. Thus, any -2 log λ value of 3.84 or above will be considered evidence of a strong association between an action and a word of interest (i.e., between a verb-argument tuple and a term). The -2 log λ value may be called the "significance threshold" or the "threshold." Thus, in the example just given, the value of 3.84 is considered the "significance threshold." Those of skill in the art will recognize that other methods or formulations may be used to compute or measure of the association between an action and a word of interest. For example, one can use the methods of mutual information or $X^2$ to compute a numerical quantification of the strength of the association between each of the verb-argument tuples and its associated term.

At step 182, after the associations have been quantified, those tuple-term pairs whose quantified association falls below a predetermined significance threshold may be removed. In one embodiment of the invention, the logarithms of the likelihood ratios for each tuple-term pair are computed, and those tuple-term pairs that are below the significance threshold are removed. Alternatively, those tuple-term pairs that are equal to or above the significance threshold are selected for further processing. Of course, any method of identifying or selecting tuple-term pairs that meet or exceed the significance threshold is acceptable. In one embodiment the tuple-term pairs are sorted and then filtered to remove those that are below the significance threshold.

In one embodiment, the verb forms, in the verb-argument tuples are lemmatized, or in other words, their base forms (e.g., eat) replace the inflected verbs (e.g., eats). The computation of the lemma of each verb in the set of tuple-term pairs may be performed to reduce the number of verbs that must be stored in a database and/or to reduce the amount of data needed to train the models. However, those of skill in the art will recognize that any computation of lemmata is a matter of design choice.

A sample of the highest ranking tuple-term pairs (i.e., a sample of those tuple-term pairs with log likelihood ratios above the significance threshold) is given in Table 3. Again, there is still noise, including, for example, a misanalyzed complex nominal (dine room from dining room) and a misparsed examples (find in Simpson from find in Simpson's X).

TABLE 3

Most likely actions associated with particular rooms.

| Likelihood Ratio | Frequency of Tuple/Target-Term Pair, $c_{12}$ | Frequency of Tuple, $c_1$ | Frequency of Term, $c_2$ | Tuple | Term |
|---|---|---|---|---|---|
| 306.585215 | 143 | 424 | 10227 | dine room | dining room |
| 196.753628 | 63 | 65 | 32243 | find in Simpson | bedroom |
| 150.457758 | 29 | 31 | 10227 | serve in room | dining room |
| 137.680378 | 35 | 51 | 10227 | designate areas | dining room |
| 117.189848 | 23 | 25 | 10227 | cat in room | dining room |
| 109.719646 | 25 | 29 | 12457 | wash clothes | laundry room |
| 107.275571 | 24 | 30 | 10227 | cook on premises | dining room |
| 100.616896 | 19 | 19 | 12457 | sell in America | laundry room |
| 96.602198 | 205 | 575 | 32243 | live room | bedroom |
| 79.429912 | 15 | 15 | 12457 | cook appliances | laundry room |
| 76.659647 | 43 | 68 | 28224 | kill people | garage |
| 61.528933 | 49 | 64 | 51214 | sit at table | kitchen |
| 61.103395 | 30 | 47 | 24842 | give birth | bathroom |
| 61.067298 | 18 | 18 | 32243 | see socks | bedroom |
| 58.542468 | 16 | 16 | 28224 | rent van | garage |
| 54.146381 | 18 | 21 | 24842 | wash hands | bathroom |
| 51.280771 | 21 | 54 | 10227 | dine rooms | dining room |
| 51.111709 | 26 | 28 | 51214 | prepare meals | kitchen |
| 49.807875 | 10 | 10 | 14575 | push down gantlet | hallway |
| 49.807875 | 10 | 10 | 14575 | form gantlet | hallway |
| 47.564595 | 13 | 13 | 28224 | carry bomb | garage |

At step 184, the remaining tuple-term pairs are filtered to identify those tuples that designate reasonable depictable actions. In one embodiment, this may be done by extracting actions from the set of sentences input to the text-to-scene conversion system. That is, by extracting actions from the sentences that have been input specifically to generate a scene. In one embodiment, approximately 3,400 sentences were evaluated for activities. This represents a corpus of about 20,000 words of text. Other methods may be used to identify tuples that designate reasonable depictable actions. For example, a list of depictable actions may be generated manually, or by any means known to those of skill in the art. Additionally, there may be actions present which are undesirable to depict; these actions may also be identified in the filtering process.

Once the activities are identified, those activities are used to select reasonable depictable actions from the log likelihood ratio ordered list, such as the list represented by Table 3. An example of a final list, for rooms in a house, is shown in Table 4. A similar example, for times of day, is shown in Table 5.

TABLE 4

Most likely actions associated with particular rooms, after filtering with tuples extracted from text-to-scene input sentences.

| Likelihood Ratio | Frequency of Tuple/Target-Term Pair, $c_{12}$ | Frequency of Tuple, $c_1$ | Frequency of Term, $c_2$ | Tuple | Term |
|---|---|---|---|---|---|
| 92.282095 | 175 | 433 | 24730 | live room | bedroom |
| 73.256801 | 17 | 21 | 7906 | wash clothes | laundry room |
| 51.118373 | 18 | 20 | 21056 | wash hands | bathroom |
| 35.438165 | 19 | 26 | 23479 | drive car | garage |
| 34.289413 | 18 | 26 | 21056 | go to bathroom | bathroom |
| 30.699638 | 16 | 23 | 21056 | brush teeth | bathroom |
| 16.510044 | 5 | 5 | 23479 | run car | garage |
| 16.107447 | 18 | 29 | 32408 | wash dishes | kitchen |
| 14.545979 | 4 | 6 | 7906 | go to store | laundry room |
| 14.284725 | 11 | 18 | 24730 | go to bed | bedroom |

TABLE 4-continued

Most likely actions associated with particular rooms, after filtering with tuples extracted from text-to-scene input sentences.

| Likelihood Ratio | Frequency of Tuple/Target-Term Pair, $c_{12}$ | Frequency of Tuple, $c_1$ | Frequency of Term, $c_2$ | Tuple | Term |
|---|---|---|---|---|---|
| 13.490176 | 10 | 18 | 21056 | take shower | bathroom |
| 13.286761 | 5 | 5 | 32408 | see in kitchen | kitchen |
| 12.792577 | 4 | 4 | 24730 | sit on sofa | bedroom |
| 11.718897 | 11 | 20 | 24730 | sit on bed | bedroom |
| 10.559389 | 3 | 3 | 21056 | sit on toilet | bathroom |
| 10.329526 | 9 | 13 | 32408 | sit at table | kitchen |
| 9.594336 | 3 | 3 | 24730 | hold knife | bedroom |
| 9.594336 | 3 | 3 | 24730 | climb over wall | bedroom |
| 8.774370 | 5 | 11 | 12756 | sit on floor | hallway |
| 8.495289 | 5 | 6 | 32408 | make breakfast | kitchen |
| 8.240026 | 4 | 5 | 24730 | play guitar | bedroom |
| 8.177386 | 6 | 8 | 32408 | eat meal | kitchen |
| 7.971921 | 3 | 3 | 32408 | cook meal | kitchen |
| 7.945854 | 11 | 24 | 24730 | leave house | bedroom |
| 7.945854 | 11 | 24 | 24730 | knock on door | bedroom |

TABLE 5

Most likely actions associated with particular times of day, after filtering with tuples extracted from text-to-scene conversion system input sentences.

| Likelihood Ratio | Frequency of Tuple/Target-Term Pair, $c_{12}$ | Frequency of Tuple, $c_1$ | Frequency of Term, $c_2$ | Tuple | Term |
|---|---|---|---|---|---|
| 35.729439 | 28 | 40 | 385312 | read newspapers | morning |
| 33.804553 | 32 | 50 | 385312 | eat breakfast | morning |
| 26.415083 | 15 | 32 | 166691 | drink tea | evening |
| 19.529204 | 38 | 48 | 743374 | sleep on floor | night |
| 17.679023 | 13 | 18 | 385312 | look in mirror | morning |
| 13.972083 | 7 | 8 | 385312 | celebrate Easter | morning |
| 11.686620 | 8 | 8 | 743374 | play trumpet | night |
| 11.240171 | 10 | 28 | 176501 | eat lunch | afternoon |
| 10.322243 | 126 | 213 | 743374 | go to bed | night |
| 9.572043 | 15 | 60 | 166691 | eat dinner | evening |
| 9.413257 | 6 | 14 | 166691 | cook meal | evening |
| 9.232992 | 16 | 32 | 385312 | take shower | morning |
| 8.673115 | 2 | 2 | 176501 | see boat | afternoon |
| 8.673155 | 2 | 2 | 176501 | roll in front | afternoon |
| 8.673155 | 2 | 2 | 176501 | rake leaves | afternoon |
| 8.573500 | 2 | 3 | 71317 | sleep in chair | noon |
| 8.325358 | 3 | 3 | 385312 | throw egg | morning |
| 8.325358 | 3 | 3 | 385312 | take to hills | morning |
| 7.824066 | 17 | 22 | 743374 | sleep in bed | night |

At step 186, once depictable tuple-term pairs are identified, they may be stored in environmental database 38 (FIG. 1), or another database accessible to the depiction module 34 (FIG. 1). The depictable tuple term-pairs may be used to depict the environment in which the action described by the verb in the tuple-term pair takes place. For example, if the sentence John makes breakfast was input to a text-to-scene conversion program using the method described herein, then, according to one embodiment, the depiction module 34 would recognize (i.e., perform calculations to, for example, match, locate, or identify) the tuple-term pair "makes breakfast kitchen" or the base form "make breakfast kitchen" and depict a three dimensional "kitchen" environment within which to place the subject of the action (i.e., the actor John). The method may end at step 188.

Figure 24:
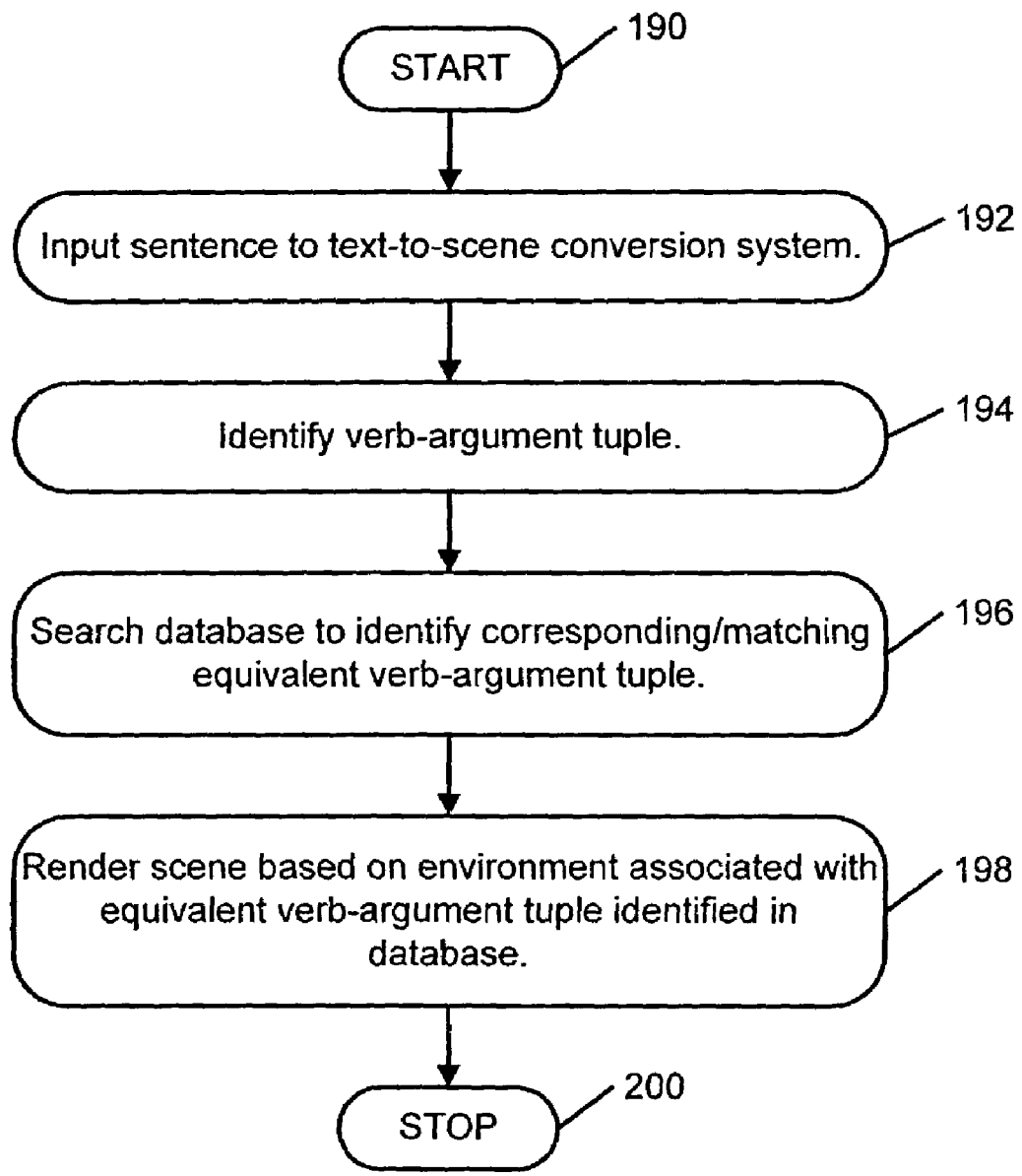
FIG. 24 is a flow diagram of a method of inferring an environment from a sentence input to a text-to-scene conversion system in accordance with an embodiment of the invention.

FIG. 24 is a flow diagram of a method of inferring an environment from a sentence input to a text-to-scene conversion system in accordance with an embodiment of the invention. An input sentence may include at least a verb-argument tuple and a subject (e.g., an actor) of an action that is included in the verb-argument tuple. The method may start at step 190. At step 192, a sentence may be input to the text-to-scene conversion system. At step 194, a verb-argument tuple in the sentence input to the text-to-scene conversion system may be identified. A method for identifying the verb-argument tuple may include, for example, using a simple matching algorithm to identify verbal-part-of-speech tags and then searching for the end of the following noun phrase. Other methods of identifying a verb-argument tuple in the sentence input to the text-to-scene conversion system may be used without departing from the scope of the invention. At step 196, a database may be searched to identify a verb-argument tuple that is equivalent to the verb-argument tuple identified in step 194. Verb-argument tuple equivalence, in this instance, may be interpreted as meaning the identification of verb-argument tuples that identically match, or that include a lemmatized form of a verb in the verb-argument tuple, a base form of the verb in the verb-argument tuple, or an inflected form of the verb in the verb-argument tuple; other forms known to those of skill in the art may also be considered as equivalents.

The database may include a plurality of verb-argument tuples and at least one environmental term associated with each of the plurality of verb-argument tuples. As used herein, an environmental term refers to, for example, a name of: a location, an occupied space, an unoccupied space, a room, a time of day, or a season. At step 198, the text-to-scene conversion system may render a scene having an environment described by the environmental term associated with the identified equivalent verb-argument tuple. In other words, the text-to-scene conversion system may render a scene wherein which the subject of the sentence is illustrated as existing within the environment associated with the equivalent verb-argument tuple. For example, as discussed above, in response to the input of the sentence "John makes breakfast," the system could render a male figure standing in a three-dimensional kitchen environment. The method may end at step 200.

Figure 25:
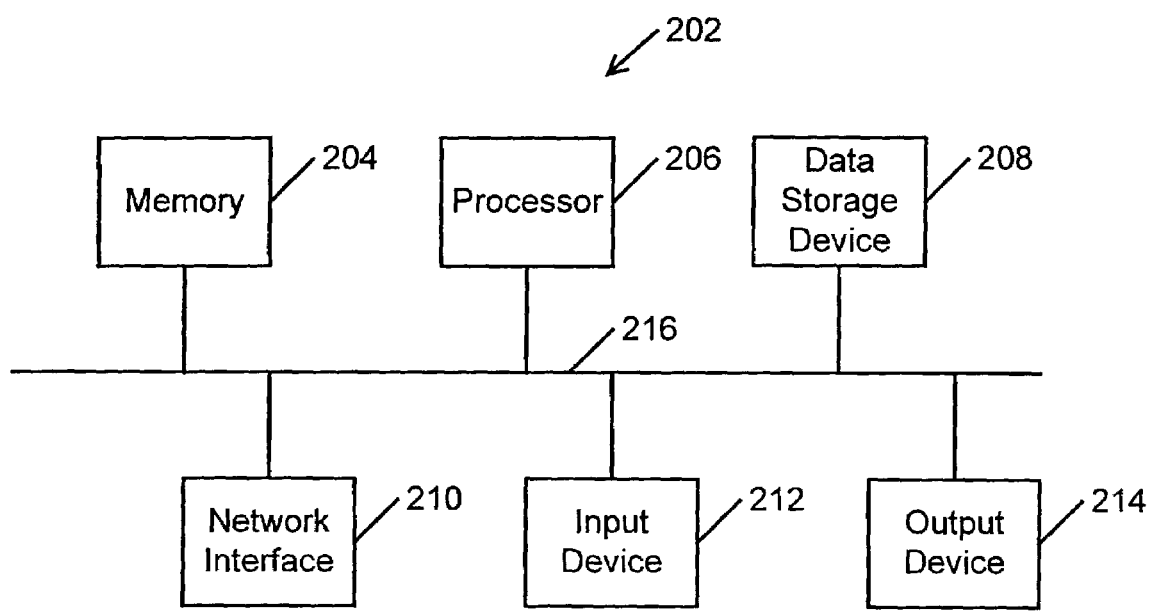
FIG. 25 illustrates an exemplary apparatus capable of implementing a text-to-scene conversion system, in accordance with an embodiment of the invention.

FIG. 25 illustrates an exemplary apparatus 202 capable of implementing a text-to-scene conversion system, in accordance with an embodiment of the invention. The apparatus 202 may include a memory 204, a processor 206, a data storage device 208, a network interface 210, an input device 212, an output device 214, all coupled to bus 216. While FIG. 25 illustrates the exemplary items 204, 206, 208, 210, 212, 214 included within apparatus 202 as being coupled to a common bus 216, nothing herein should be construed as requiring the exemplary items 204, 206, 208, 210, 212, 214 to be collocated.

The memory 204 may be any memory including, for example, static or dynamic random access memory, or flash memory. Memory 204 may store an operating system and may store instructions required to perform a method in accordance with an embodiment of the invention. Memory 204 may also be used to store a database, such as environmental database 38, object database 40, pose database 42, or emblem database 44 (all of FIG. 1). However, such database storage may alternatively or additionally be implemented in an alternative location, such as a data storage device 208. Database 208 may be any data storage device, including, for example, a hard disk, CD-ROM, or tape drive.

The processor 206 may be any processor capable of being configured or programmed to execute instructions required to perform a method in accordance with an embodiment of the invention and generally control operations related to the text-to-scene conversion system. The processor 206 need not be dedicated to the apparatus 202 implementing the text-to-scene conversion system; it may be used for other applications as well.

The network interface 210 may, for example, be any sort of data transmission or receiving device, such as a modem, a network interface card, wireless device or a telephone line transceiver. The network interface 210 operatively couples a communications network (not shown) to the processor 206 via bus 216.

An input device 212, such as a keypad, gaming pad, microphone, any type of audio input unit, and/or any type of data input unit, may be included in the text-to-scene conversion apparatus 202. The input device 240 may be used to enter text (as characters or audible sounds for subsequent voice-to-text translation) to the apparatus 202.

An output device 214 may include any device or combination of devices that convert electrical signals to images for the rendering of scenes in accordance with the invention disclosed herein. Examples of output devices 214 may include cathode ray tube displays, plasma displays, flat panel displays, and printers.

While there has been described what are believed to be the preferred embodiments of the present invention, those skilled in the art will recognize that other and further changes and modifications may be made thereto without departing from the spirit of the invention, and it is intended to claim all such changes and modifications as fall within the true scope of the invention.

What is claimed is:

1. A computer-implemented method of generating a set of tuple-term pairs from a corpus of text, comprising:
   compiling via a processor a set of concordance lines for a set of terms in the corpus;
   storing a first set of verb-argument tuples and associated terms from the set of concordance lines;
   computing via the processor a numerical quantification of a strength of association between each verb-argument tuple and associated term in the first set;
   selecting, from the first set, each verb-argument tuple and associated term whose numerical quantification of strength of association is greater than a predetermined threshold, wherein the selected verb-argument tuples and associated terms form the set of the tuple-term pairs representing most likely actions associated with the set of terms;
   identifying each tuple-term pair in the set of tuple-term pairs having a verb that matches a verb in a sentence input to a text-to-scene conversion system that constructs an arbitrary three-dimensional scene from input text without using previously stored images; and
   storing the identified tuple-term pairs in a database.

2. The method of claim 1, wherein each term in the set of terms describes an aspect of the environment of a scene.

3. The method of claim 2, wherein the aspect of the environment of a scene denotes one of a name of: a location, an occupied space, an unoccupied space, a room, a time of day, or a season.

4. The method of claim 1, wherein the verb-argument tuples are one of a verb-object tuple or a verb-preposition-object tuple.

5. The method of claim 1, wherein computing the numerical quantification of the strength of association comprises:
   computing a ratio of a likelihood of a first and a second hypothesis, wherein:
   the first hypothesis indicates that a probability of the verb-argument tuple occurring given the associated term is indistinguishable from a probability of the verb-argument tuple occurring given something other than the associated term, and the second hypothesis indicates that the probability of the verb-argument tuple occurring given the associated term is distinguishable from the probability of the verb-argument tuple occurring given something other than the associated term.

6. The method of claim 1, further comprising deleting duplicate concordance lines from the set of concordance lines.

7. The method of claim 1, further comprising filtering the set of concordance lines to remove collocations.

8. The method of claim 1, further comprising computing a lemma of each verb in the set of tuple-term pairs.

9. The method of claim 1, wherein the verb is in one of a base form or an inflected form.

10. The method of claim 1, further comprising depicting an action described by the verb in the tuple-term pair in the context of the environment denoted by the term of the tuple-term pair.

11. An apparatus having:
a memory; and
a processor performing steps comprising:
compiling a set of concordance lines for a set of terms in a corpus of text;
storing a first set of verb-argument tuples and associated terms from the set of concordance lines;
computing a numerical quantification of a strength of association between each verb-argument tuple and associated term in the first set;
selecting, from the first set, each verb-argument tuple and associated term whose numerical quantification of strength of association is greater than a predetermined threshold, wherein the selected verb-argument tuples and associated terms form a set of tuple-term pairs representing most likely actions associated with the set of terms;
identifying each tuple-term pair in the set of tuple-term pairs having a verb that matches a verb in a sentence input to a text-to-scene conversion system that constructs an arbitrary three-dimensional scene from input text without using previously stored images; and
storing the identified set of tuple-term pairs in the memory.

12. The apparatus of claim 11, wherein the computation of the numerical quantification of the strength of association comprises:
computing a ratio of a likelihood of a first and a second hypothesis, wherein:
the first hypothesis indicates that a probability of the verb-argument tuple occurring given the associated term is indistinguishable from a probability of the verb-argument tuple occurring given something other than the associated term, and
the second hypothesis indicates that the probability of the verb-argument tuple occurring given the associated term is distinguishable from the probability of the verb-argument tuple occurring given something other than the associated term.

13. A machine-readable medium having stored thereon a plurality of executable instructions, the plurality of instructions comprising instructions to:
compile a set of concordance lines for a set of terms in a corpus of text;
store a first set of verb-argument tuples and associated terms from the set of concordance lines;
compute a numerical quantification of a strength of association between each verb-argument tuple and associated term in the first set; and
select, from the first set, each verb-argument tuple and associated term whose numerical quantification of strength of association is greater than a predetermined threshold, wherein the selected verb-argument tuples and associated terms form a set of tuple-term pairs representing most likely actions associated with the set of terms;
identify each tuple-term pair in the set of tuple-term pairs having a verb that matches a verb in a sentence input to a text-to-scene conversion system that constructs an arbitrary three-dimensional scene from input text without using previously stored images; and
store the identified set of tuple-term pairs.

14. The machine readable medium of claim 13, wherein the computation of the numerical quantification of the strength of association comprises:
computing a ratio of likelihood of a first and a second hypothesis, wherein:
the first hypothesis indicates that a probability of the verb-argument tuple occurring given the associated term is indistinguishable from a probability of the verb-argument tuple occurring given something other than the associated term, and
the second hypothesis indicates that the probability of the verb-argument tuple occurring given the associated term is distinguishable from the probability of the verb-argument tuple occurring given something other than the associated term.

15. A computer-implemented method of inferring an environment from a sentence input to a text-to-scene conversion system, the method comprising:
receiving a sentence as input text at a text-to-scene conversion system;
constructing an arbitrary three-dimensional scene from the input text without using previously stored images;
identifying a verb-argument tuple in the sentence, the sentence comprising at least the verb-argument tuple and a subject of an action included in the verb-argument tuple;
identifying an equivalent verb-argument tuple in a database, the database comprising a plurality of verb-argument tuples and at least one environmental term associated with each of the plurality of verb-argument tuples; and
rendering an environment via the text-to-scene conversion system, within which to place the subject, according to the environmental term associated with the equivalent verb-argument tuple.

16. The method of claim 15, wherein the verb-argument tuple is one of a verb-object tuple or a verb-preposition-object tuple.

17. The method of claim 15, wherein the equivalent verb-argument tuple includes one of a lemmatized form of a verb in the verb-argument tuple, a base form of the verb in the verb-argument tuple, or an inflected form of the verb in the verb-argument tuple.

18. The method of claim 15, wherein the environmental term includes one of a name of: a location, an occupied space, an unoccupied space, a room, a time of day, or a season.

19. An apparatus that infers an environment from a sentence input to a text-to-scene conversion system, the apparatus comprising:
- a memory;
- a database; and
- a processor, coupled to the memory and the database, the processor performing the steps comprising;
    - receiving a sentence as input text at a text-to-scene conversion system;
    - constructing an arbitrary three-dimensional scene from the input text without using previously stored images;
    - identifying a verb-argument tuple in a sentence stored in the memory, the sentence comprising at least the verb-argument tuple and a subject of an action included in the verb-argument tuple;
    - identifying an equivalent verb-argument tuple in the database, the database comprising a plurality of verb-argument tuples and at least one environmental term associated with each of the plurality of verb-argument tuples; and
    - generating a set of instructions to render an environment, within which to place the subject, according to the environmental term associated with the equivalent verb-argument tuple.

20. The method of claim 19, wherein the environmental term includes one of a name of: a location, an occupied space, an unoccupied space, a room, a time of day, or a season.

* * * * *